(12) United States Patent
Martineau

(10) Patent No.: US 7,508,085 B2
(45) Date of Patent: Mar. 24, 2009

(54) FLEXIBLE MEMBER ENERGY CONVERSION DEVICE

(76) Inventor: Phillip Reed Martineau, 3182 S. Teton Dr., Salt Lake City, UT (US) 84109

( * ) Notice: Subject to any disclaimer, the term of this patent is extended or adjusted under 35 U.S.C. 154(b) by 236 days.

(21) Appl. No.: 11/710,053

(22) Filed: Feb. 24, 2007

(65) Prior Publication Data

US 2008/0203850 A1  Aug. 28, 2008

(51) Int. Cl.
*H02P 7/10* (2006.01)
*F02B 63/04* (2006.01)
(52) U.S. Cl. .................................. 290/1 R; 290/1 A
(58) Field of Classification Search ............... 290/1 R, 290/1 A, 4 R, 45; 310/15, 75 R
See application file for complete search history.

(56) References Cited

U.S. PATENT DOCUMENTS

| | | | | |
|---|---|---|---|---|
| 3,699,367 A | * | 10/1972 | Thomas | .................. 310/69 |
| 4,405,872 A | * | 9/1983 | Thomas | ................ 310/75 R |
| 4,429,232 A | * | 1/1984 | Thomas et al. | ............ 290/1 R |
| 4,504,761 A | * | 3/1985 | Triplett | .................... 310/339 |
| 6,291,901 B1 | * | 9/2001 | Cefo | ........................ 290/1 R |
| 6,982,497 B2 | | 1/2003 | Rome | |
| 6,628,040 B2 | | 9/2003 | Pelrine | |
| 6,768,246 B2 | | 7/2004 | Pelrine | |
| 6,809,426 B2 | * | 10/2004 | Naar et al. | ............... 290/1 R |
| 6,812,624 B1 | | 11/2004 | Pei | |
| 6,885,111 B2 | * | 4/2005 | Volpi | ......................... 290/1 R |
| 6,940,211 B2 | | 9/2005 | Pelrine | |
| 7,034,432 B1 | | 4/2006 | Pelrine | |
| 7,049,732 B2 | | 5/2006 | Pei | |
| 7,285,868 B2 | * | 10/2007 | Wilson | ..................... 290/1 R |
| 7,429,801 B2 | * | 9/2008 | Adamson et al. | ........... 290/1 R |

\* cited by examiner

*Primary Examiner*—Nicholas Ponomarenko

(57) ABSTRACT

Flexible member energy conversion device (550) converts flexible member (100) deflection mechanical energy to electrical energy. Flexible member (100) deflects and conforms to surface (40) as wheel (20) rotates while transporting load (10). Energy conversion device (550) is comprised of single or multiple electroactive polymer transducers (500), charge exchange mean (350), charge element (402), and recovery element (403). Transducer (500) is comprised of a top electrode (504), a bottom electrode (506) separated by an elastomeric polymer spacer (502). In this configuration, transducer (500) functions as a variable capacitor. Transducer (500) is elevated in capacitance when in stretched configuration and reduced capacitance when in unstretched configuration. Energy conversion device (500) produces electrical energy by transferring electric charge from charge element (402), through charge exchange means (350) to transducer (500) in stretched configuration. Transducer (500) is then allowed to return to an unstretched configuration. The charge in transducer (500) increases in energy when the transducer (500) returns to relaxed configuration. This causes the electrical charge to flow to recovery element (403) through charge exchange means (350).

20 Claims, 23 Drawing Sheets

Not Part of Disclosure

Not Part of Disclosure

1- Film Stretched at Zero Field
2- Field Increase to Maximum Level
3- Film Relaxes while Field is Maintained Near Maximum
4- Film Fully Relaxes as Field Returns to Zero

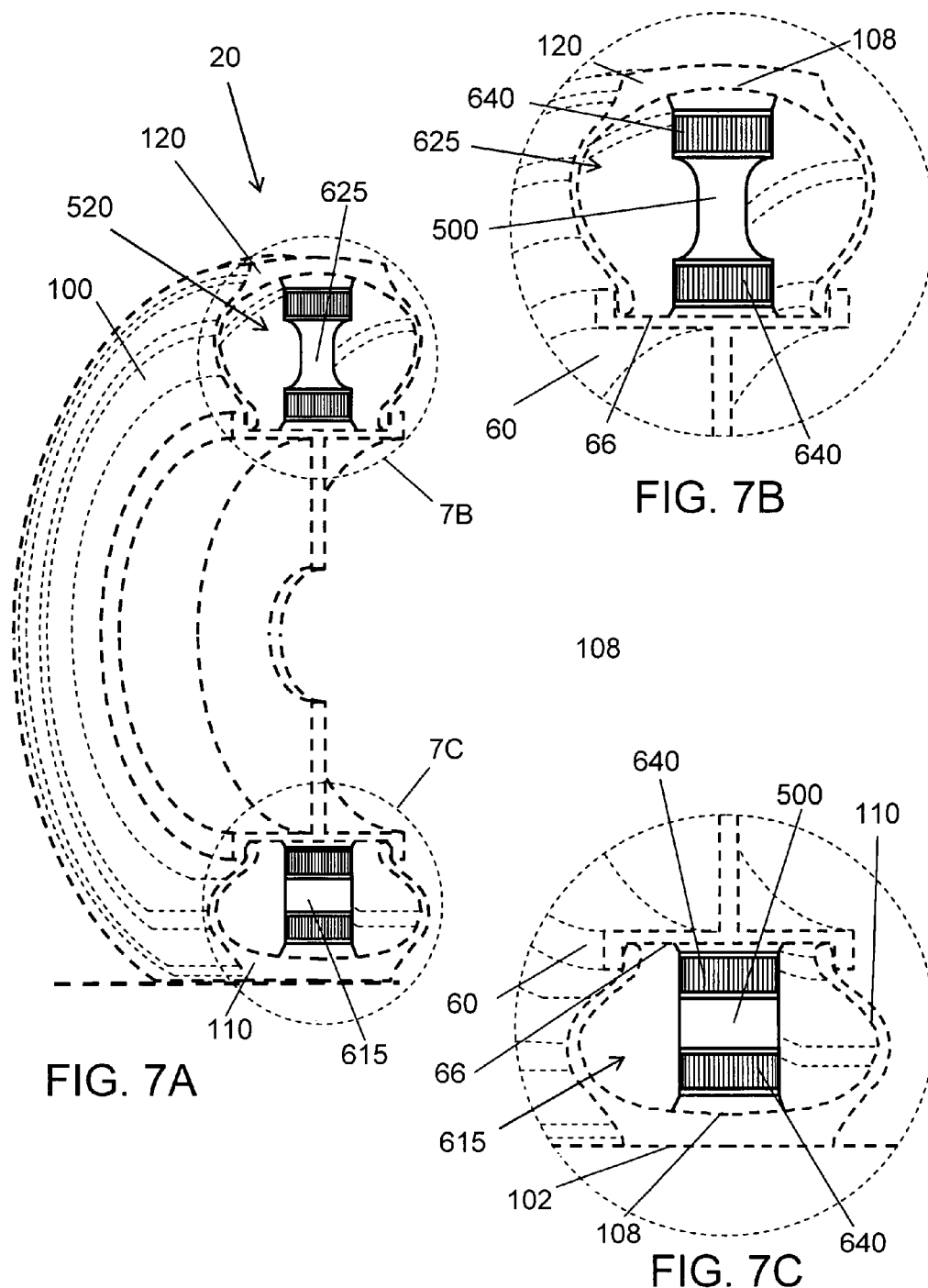

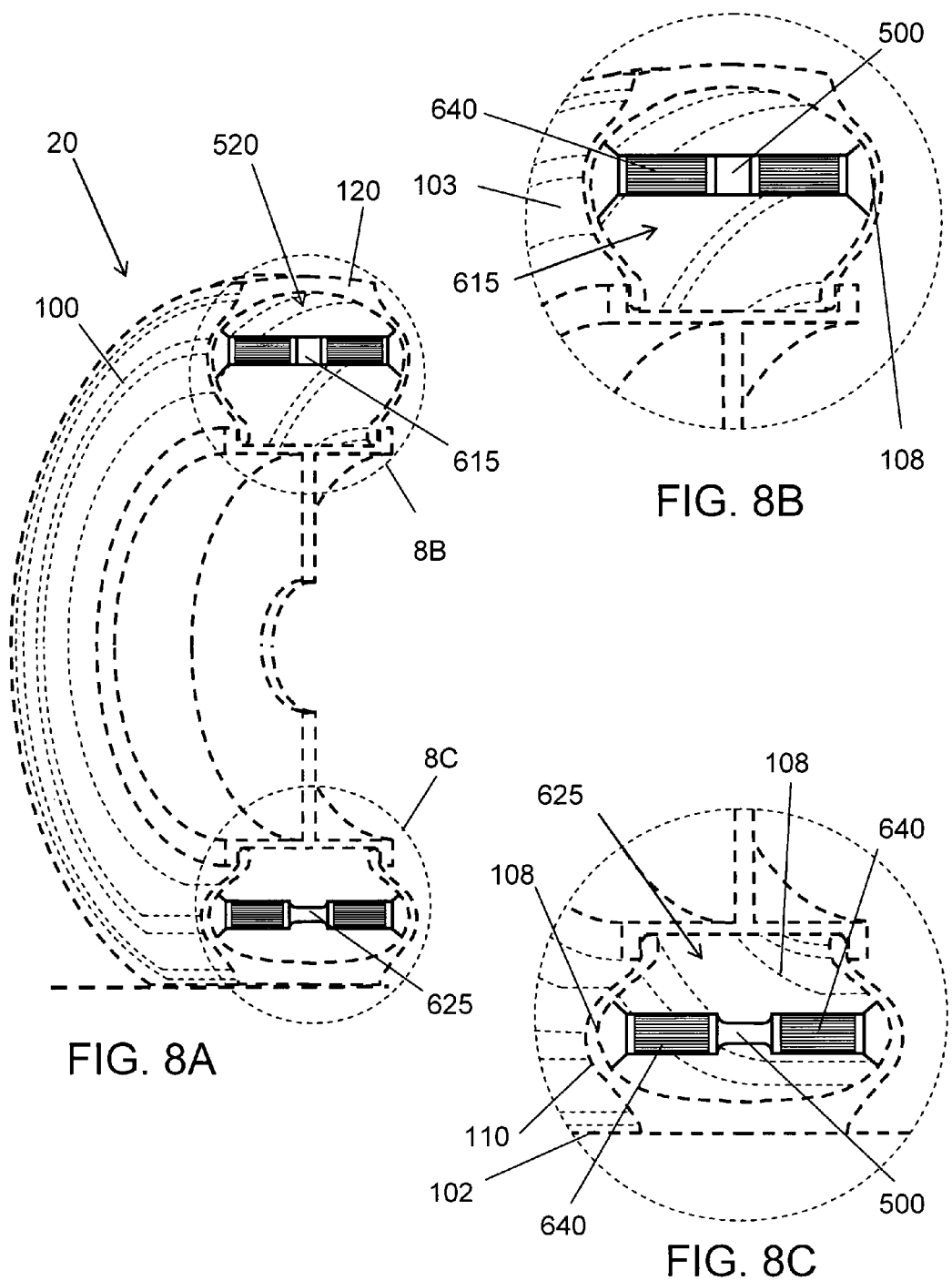

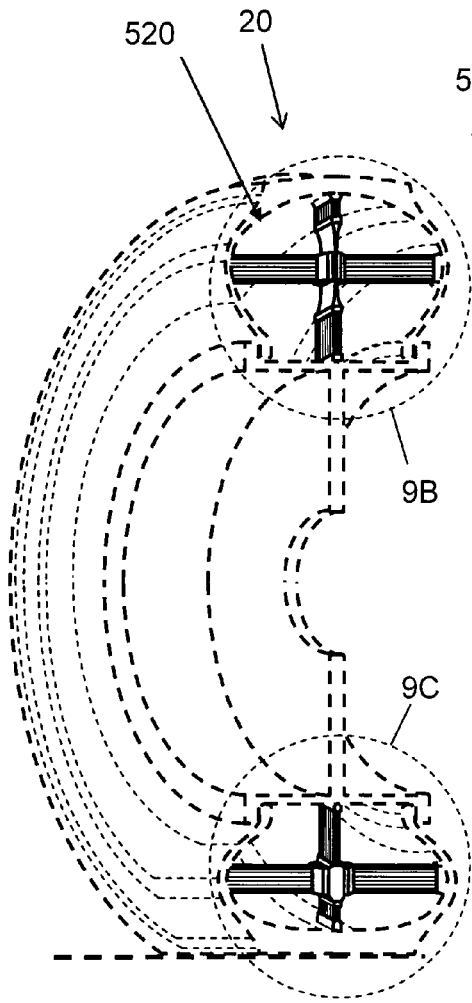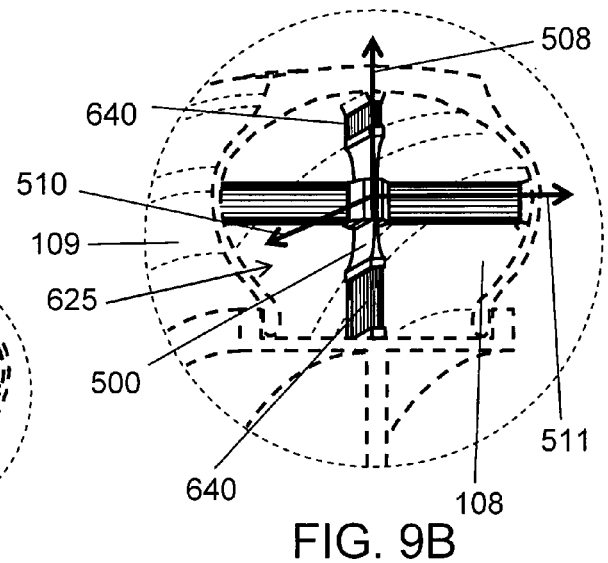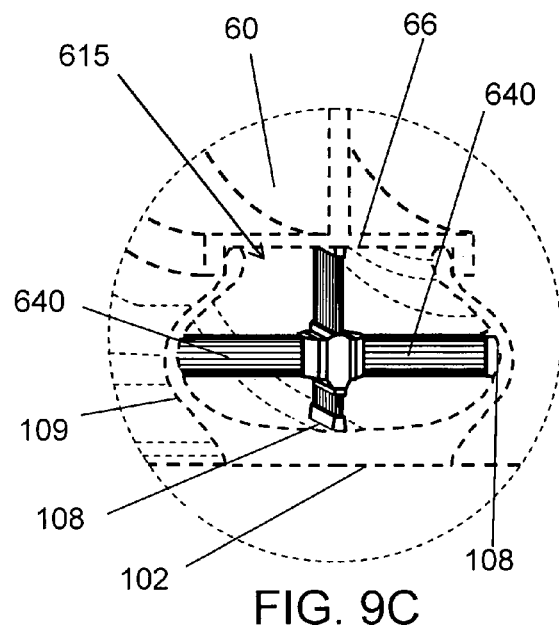
FIG. 9A
FIG. 9B
FIG. 9C

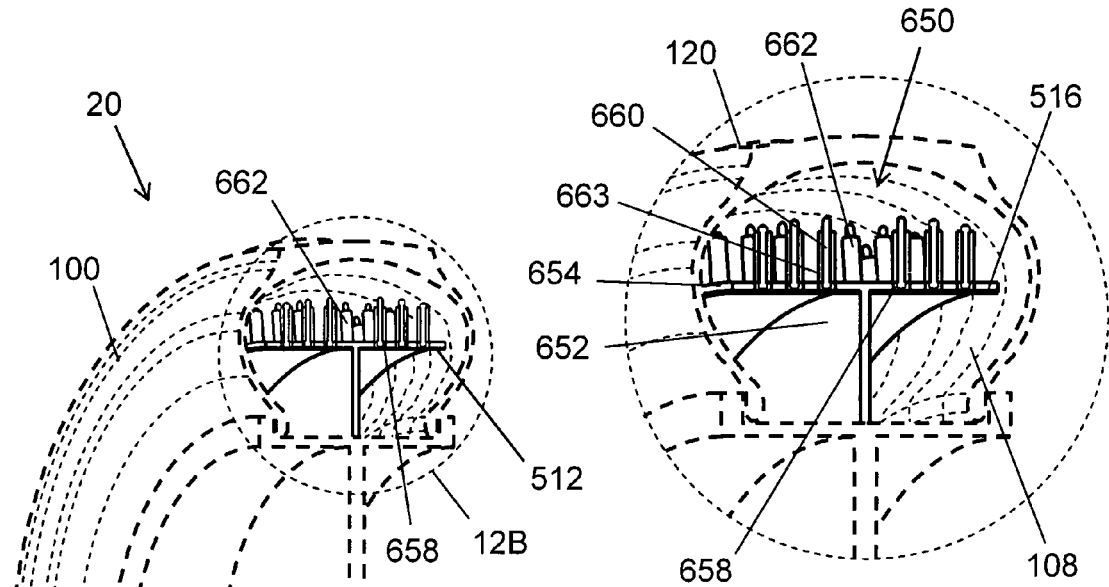
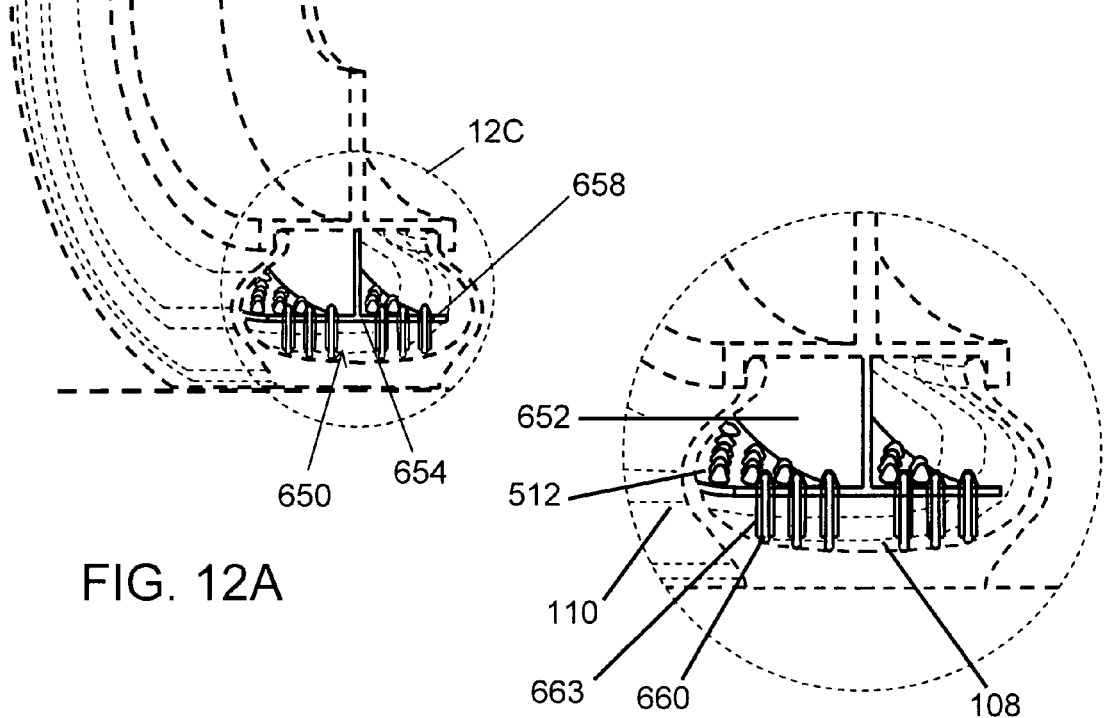

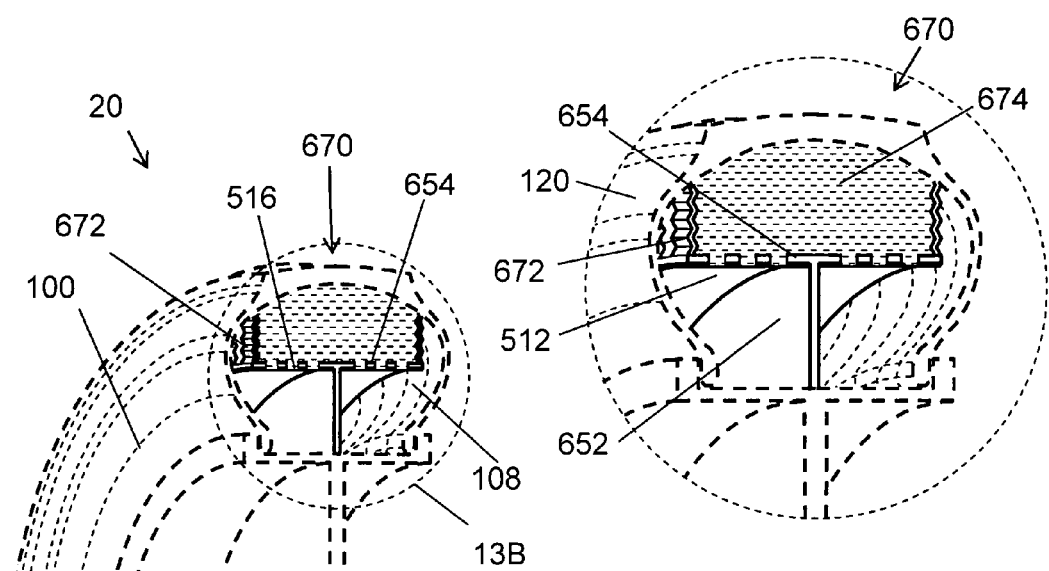
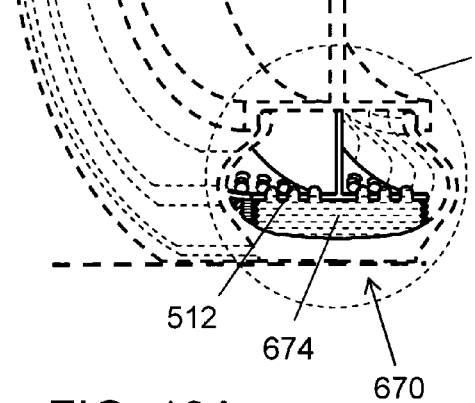
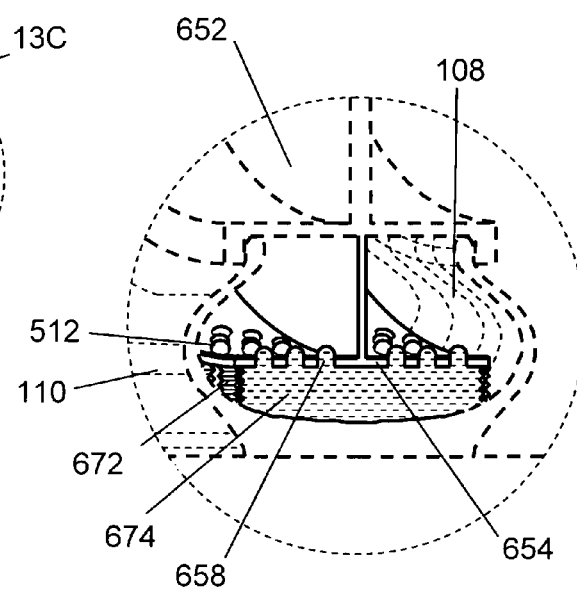
FIG. 13B
FIG. 13A
FIG. 13C

FLEXIBLE MEMBER ENERGY CONVERSION DEVICE

BACKGROUND

1. Field of Invention

This invention relates generally to the conversion of tire deflection mechanical energy from tires to electrical energy.

2. Description of Prior Art

Generating electrical energy using electroactive polymer (EAP) generators is disclosed in U.S. Pat. Nos. 7,049,732, 7,034,432, 6,940,211 and 6,812,624. Thermal energy to electrical energy conversion using EAP generators is disclosed in U.S. Pat. No. 6,628,040. Use of EAP transducers for conversion of deflection mechanical energy, in backpacks, to electrical energy is disclosed in U.S. Pat. No. 6,982,497. A means for converting biologically generated mechanical energy into electrical energy is disclosed in U.S. Pat. No. 6,768,246. In this application, EAP transducers are positioned in the heels of footwear so that deflections are imparted to the transducers. The deflections result from forces imparted the footwear heels from the heels striking the walking surface.

An additional application for EAP generators is for recovery of deflection mechanical energy from wheels used for transportation. A wheel transports a load by rolling over a surface. Typically, wheels used for transportation are comprised of a structural rim and an air inflated tire. The structural rim is affixed to a transport vehicle and provides the load path between the transport vehicle and air inflated tire. The air inflated tire contacts and conforms to the surface. The tire conforms to the surface by deflecting to match the contour of the surface.

EAP generators are uniquely suited for harvesting electrical energy from tire deflection mechanical energy. That is because EAP transducers can accommodate relatively large deflections with a large range in deflection frequencies. For example, EAP materials can sustain strains greater than 200%. This allows for mechanical energy recovery from relatively large deflections. Deflection frequencies can range from greater than zero to hundreds of Hz.

In many applications, a series of numerous EAP generators are assembled to produce usable quantities of electrical energy. EAP generators are relatively inexpensive, lightweight and are comprised of few moving parts. This makes their use cost effective.

There are examples of small strain materials that are been used to convert mechanical energy to electrical energy. These materials include piezoelectric ceramics such as lead zirconium titanate. The strain levels for these types of materials are limited to approximately 1.5%. Densities of these materials typically are above what is practical for use in mobile applications. A similar material to piezoelectric materials is EAP material "irradiated polyvinyidene" (PVDF). This material is suitable for use up to approximately 4% strain. However, this level of strain is also not suitable for the relatively large tire deflections.

Conventional electromagnetic generators are not suitable for tire deflection application because of their mechanical complexity and are relatively heavy. A typical electromechanical generator includes multiple coils of electrical wire with multiple moving parts. Typically the materials used to manufacture conventional electromechanical generators have high density relative to that of EAP generator materials. The materials and complexity of conventional electromechanical generators make them less cost effective than EAP generators. In addition, the weight of electromechanical generators makes them less suited than EAP generators for mobile electrical energy recovery.

When a loaded wheel contacts a road surface, the tire conforms to the road surface by deflecting. The unloaded portion of the tire remains circular. The loaded portion of the tire typically sustains radial deflections of approximately between 0.5 and 0.75 inches. In typical applications, wheels can transport loads that range from a few hundred pounds to a few thousand pounds. Energy is required to deflect the inflated tires. The magnitude of energy, for each tire, is the force on each tire multiplied by the radial deflection. EAP generators can be assembled in a load transporting wheel in a configuration to recover a portion of this mechanical deflection energy.

Automobiles are required to start, accelerate, operate at steady state, decelerate, and stop. The energy to accelerate and maintain the velocity of the automobile is provided through the chemical combustion in an internal combustion engine. Breaks are used to decelerate an automobile. Deceleration results in a loss of kinetic energy. Breaks dissipate this kinetic energy by friction. Friction converts the kinetic energy into heat energy.

An example of mechanical energy to electrical energy conversion is demonstrated by hybrid automobiles. Deceleration requires the automobile to dissipate kinetic energy. Hybrid automobiles employ technology that reconverts a portion of this dissipated kinetic energy. This is accomplished by converting the breaking force into torque. This torque is then used to generate electricity with conventional electromagnetic generators. The electricity is then stored and used at a later time. The stored electric energy is used to operate electric motors. These motors are used in conjunction with internal combustion engines for propulsion. This reduces the internal combustion engine fuel consumption and increases the overall operational efficiency of the automobile.

Use of hybrid automobiles can result in significant gains in fuel use efficiency for urban operation. A significant portion of automobile operation time, in an urban environment, is devoted to acceleration and deceleration. As a result, a significant portion of vehicle operational energy can be recovered from vehicle deceleration.

For conditions where a large portion of the operational time is steady state operation, the available energy for conversion from deceleration is minimal. As a result, the gains in operational efficiencies provided by hybrid automobiles are reduced significantly.

EAP generators could be used in hybrid automobiles for electrical power generation during acceleration and steady state operation. Electrical energy can then be recovered any time the automobile travels from one point to another. This provides a means for taking advantage of hybrid automobile operational efficiencies in all operational environments.

In addition, EAP generators could also be used in all-electric automobiles. The General Motors EV1 all-electric automobile is a demonstration of current all-electric technology. All-electric automobiles are powered by battery stored electrical energy. Battery storage capability technology limits the mileage range per charge of these types of automobiles. The advantage the EAP generators would provide is to increase the vehicle's range per charge.

EAP generators could also be used in stationary applications. For example, conveyor belts are used to transport loads from one location to another. Typically, conveyor belts are comprised of a flexible belt that is supported by a series of wheels. These wheels could be configured with EAP generators. The rotation of the support wheels could then recover the wheel deflection energy. This recovered energy could then be used to provide a portion of the power to operate the conveyor belt, thereby reducing overall power consumption of the conveyor belt.

OBJECTS AND ADVANTAGES

Accordingly, several objects and advantages of my invention are:

(a) to provide a means for recovery of tire deflection mechanical energy for conversion to electrical energy.

(b) to use electroactive polymer generators in the conversion of tire deflection mechanical energy to electrical energy.

(c) to provide a cost,effective means for mechanical energy conversion to electrical energy using electroactive polymer generators.

(d) to provide low weight means for mechanical energy conversion to electrical energy using electroactive polymer generators.

(e) to provide a means for converting tire deflection mechanical energy to electrical energy during acceleration and steady state vehicle operation.

(f) to provide a means for converting tire deflection mechanical energy to electrical energy where the tires are affixed to a stationary structure and a load carrying surface moves over the tires.

(g) to provide a means for converting tire deflection mechanical energy to electrical energy in automobiles.

DRAWING FIGURES

FIGS. 7A, 7B, and 7C shows transducers assemblies, with two type-1 deflection transfer elements, in radial orientation.

FIGS. 8A, 8B, and 8C shows transducers assemblies, with two type-1 deflection transfer elements, in lateral orientation.

FIGS. 9A, 9B, and 9C shows transducers assemblies, with four type-1 deflection transfer elements, in radial orientation.

Figure 10:
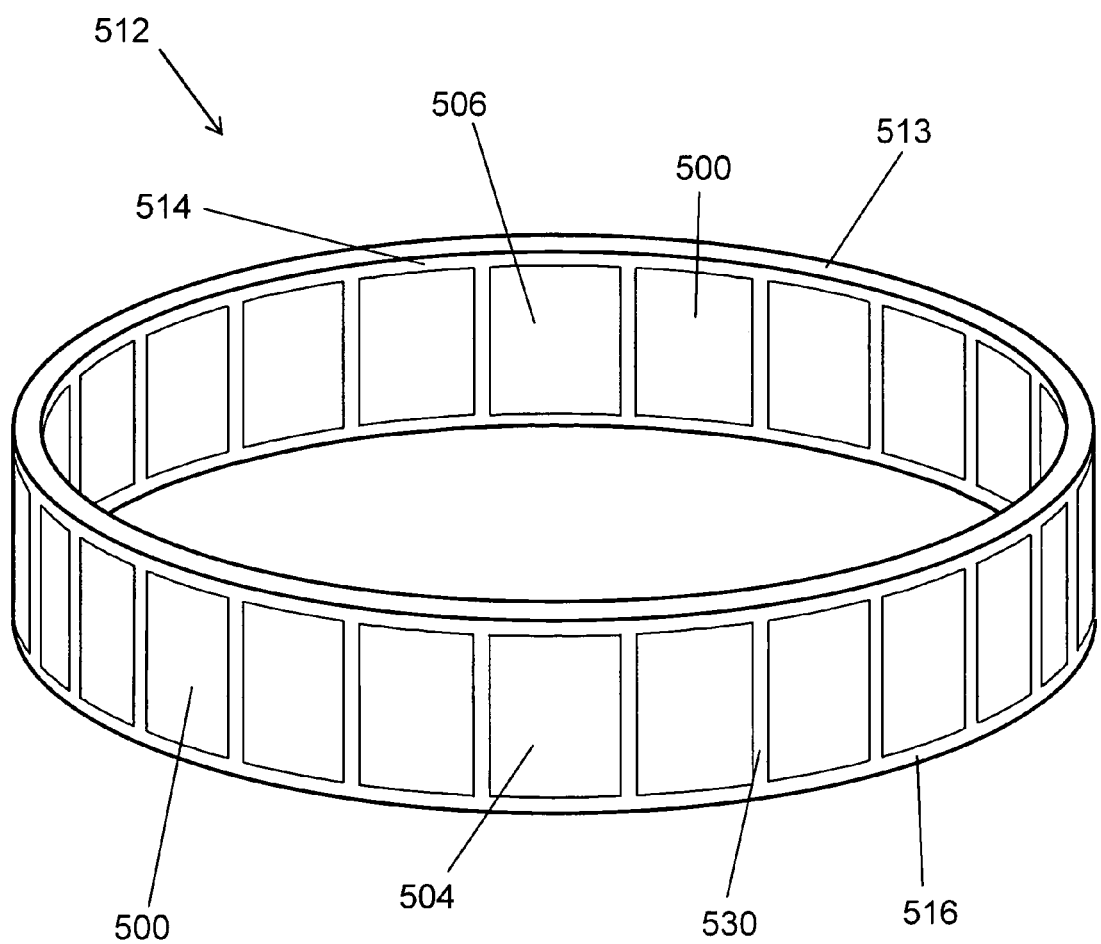

FIG. 10 shows a multiple transducer assembly.

Figure 11A:
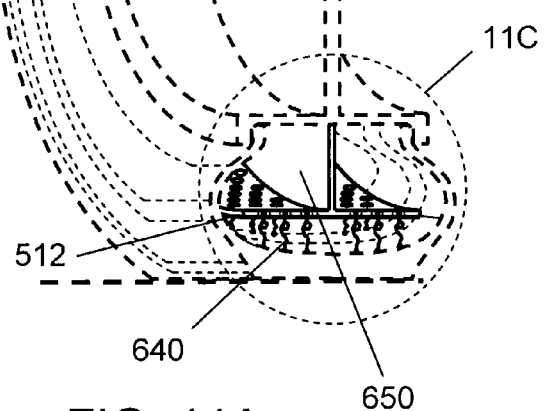
Figure 11B:
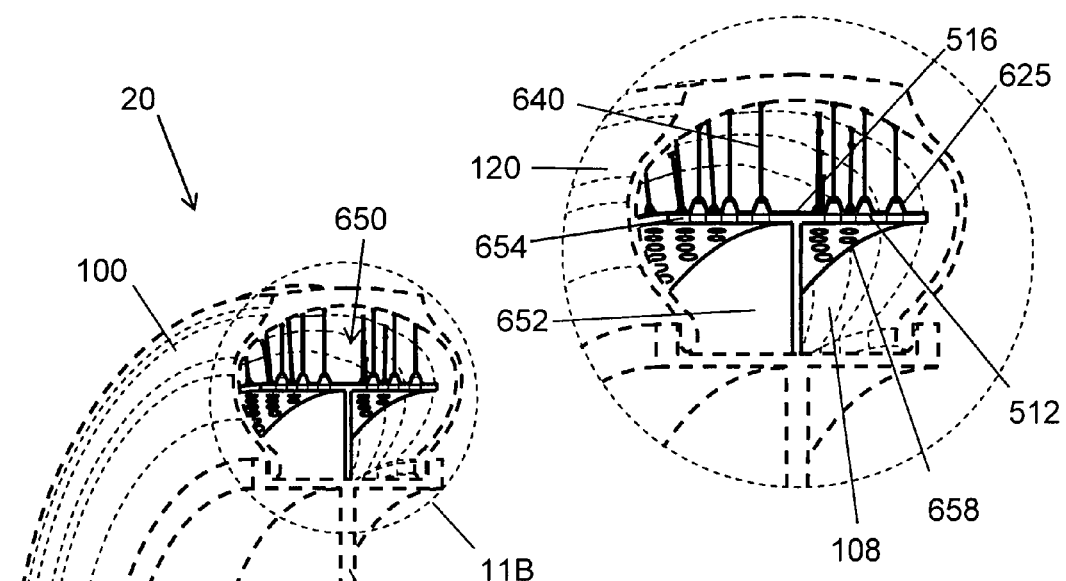
Figure 11C:
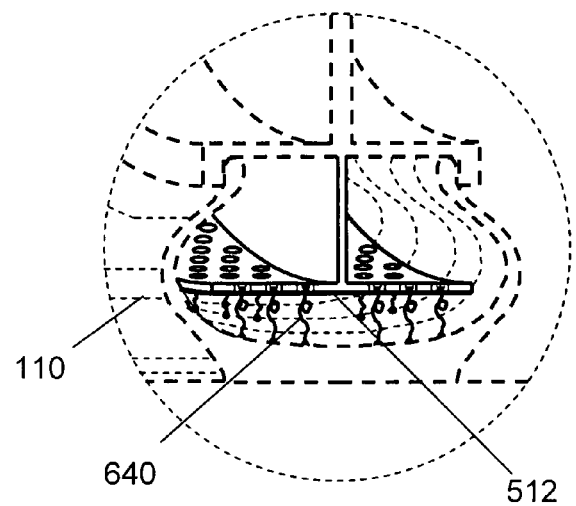

FIGS. 11A, 11B, and 11C a multiple transducer assembly in a flexible member with multiple type-1 deflection transfer elements.

FIGS. 12A, 12B, and 12C a multiple transducer assembly in a flexible member with multiple type-2 deflection transfer elements.

FIGS. 13A, 13B, and 13C a multiple transducer assembly in a flexible member with a fluid deflection transfer element.

Figure 14:
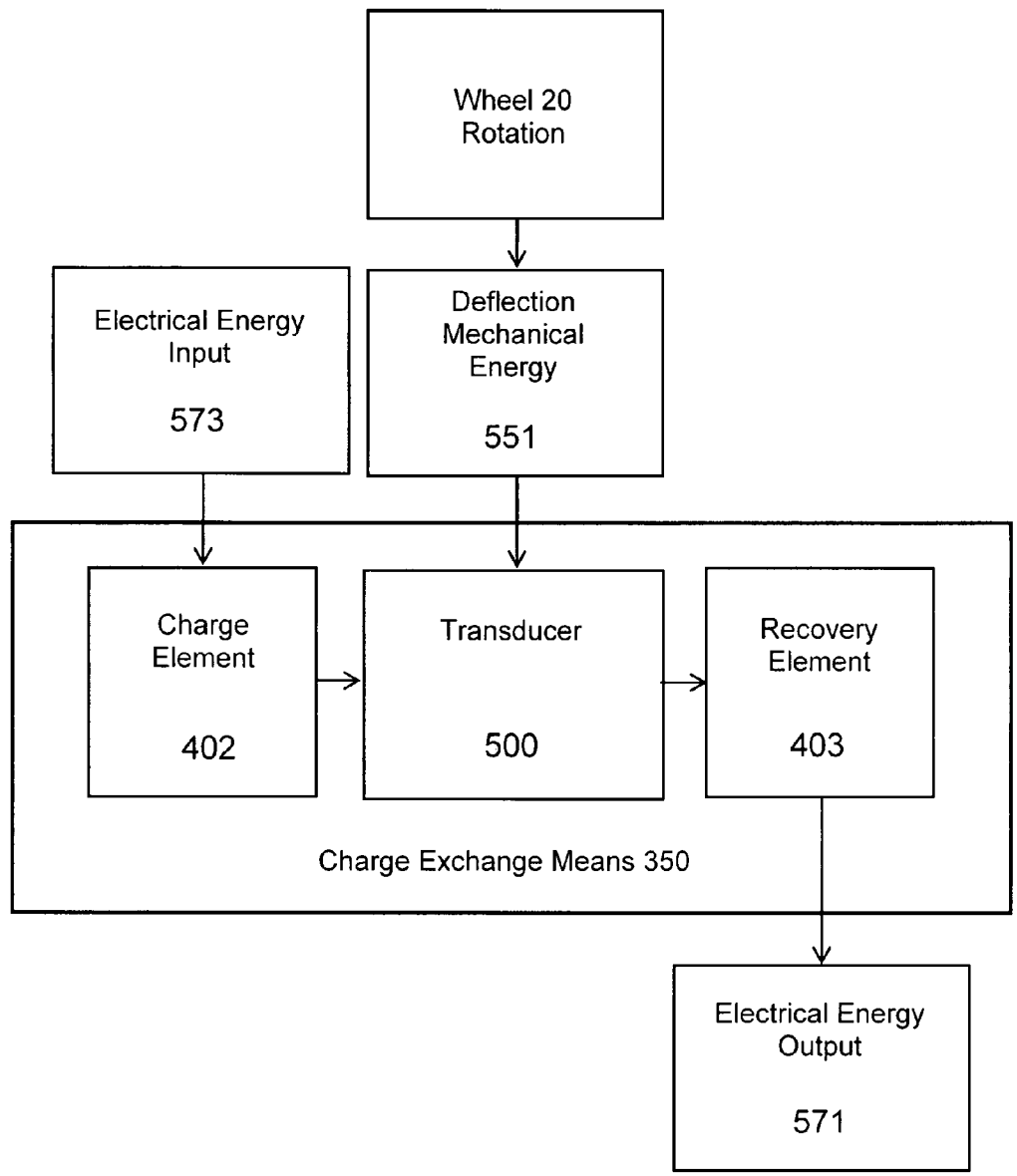

FIG. 14 shows a charge exchange block diagram.

Figure 15A:
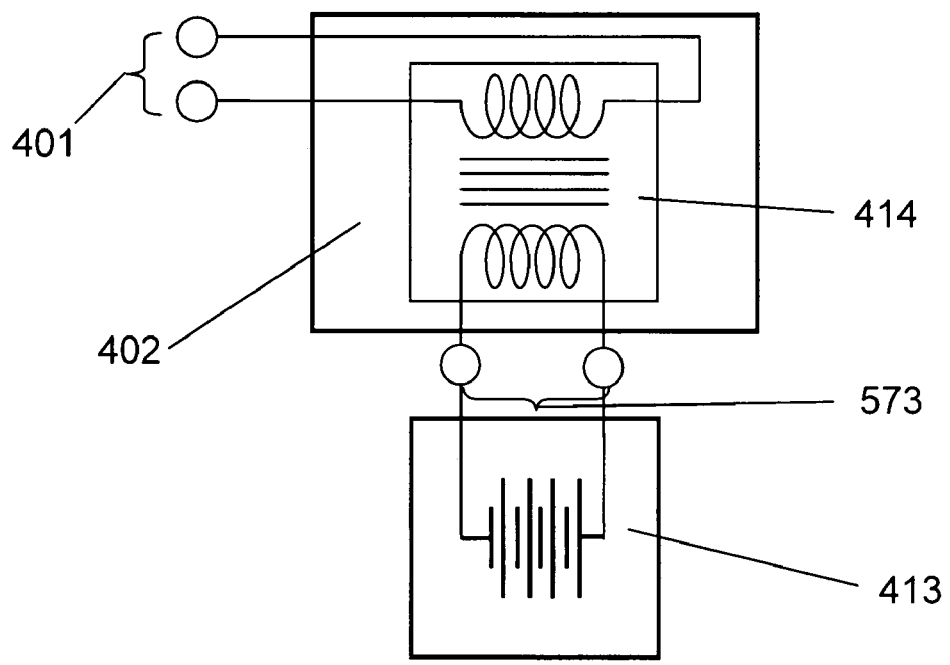

FIG. 15A shows a charge element circuit diagram.

Figure 15B:
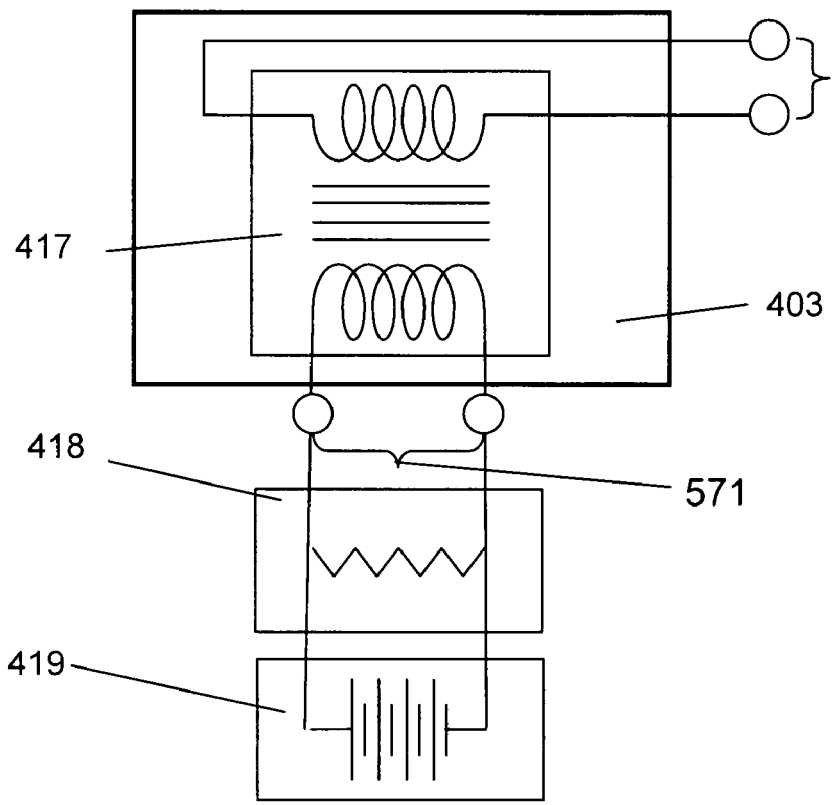

FIG. 15B shows a recovery element circuit diagram.

Figure 16A:
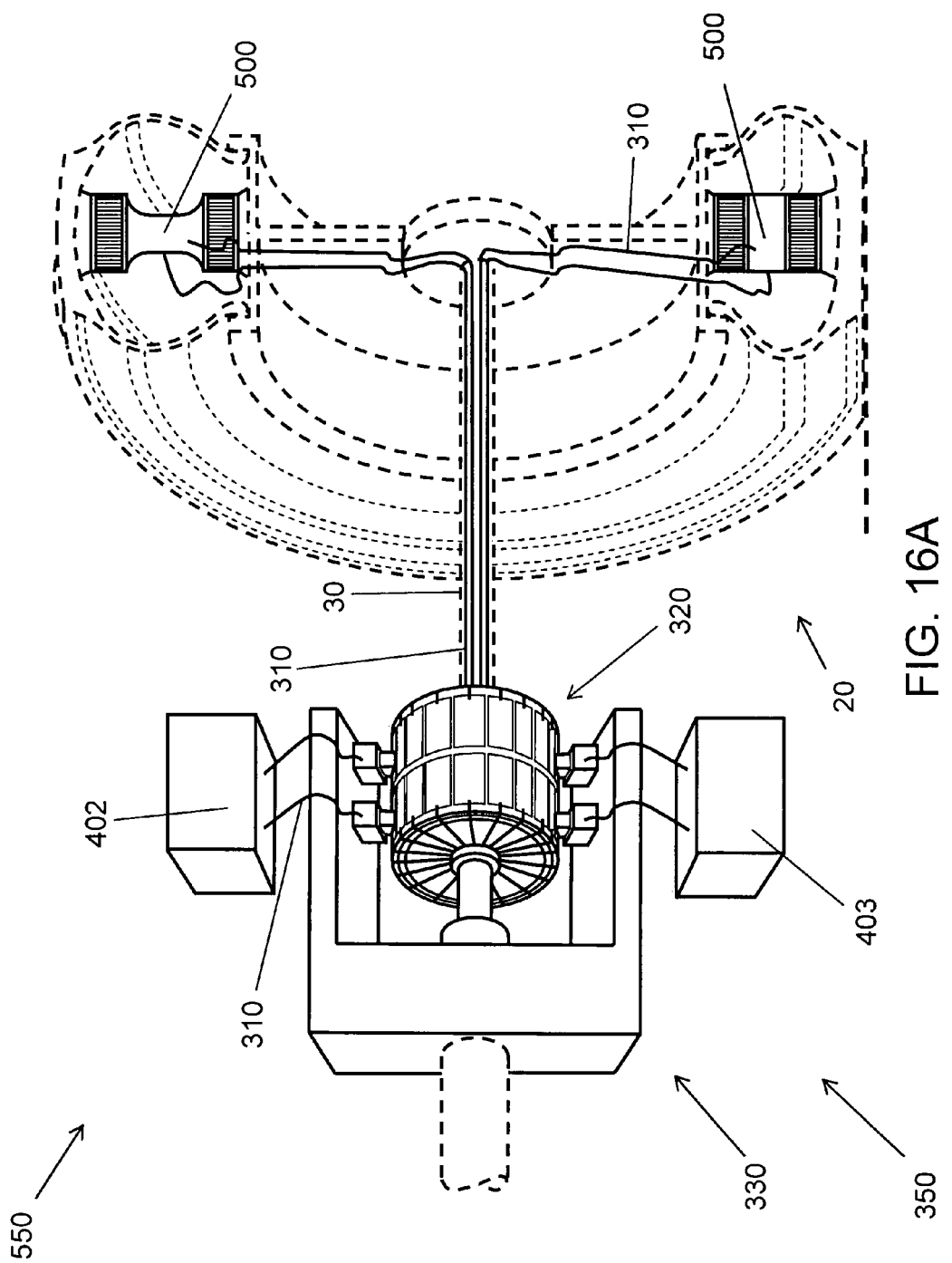

FIG. 16A shows energy conversion device assembled with a load transport wheel.

Figure 16B:
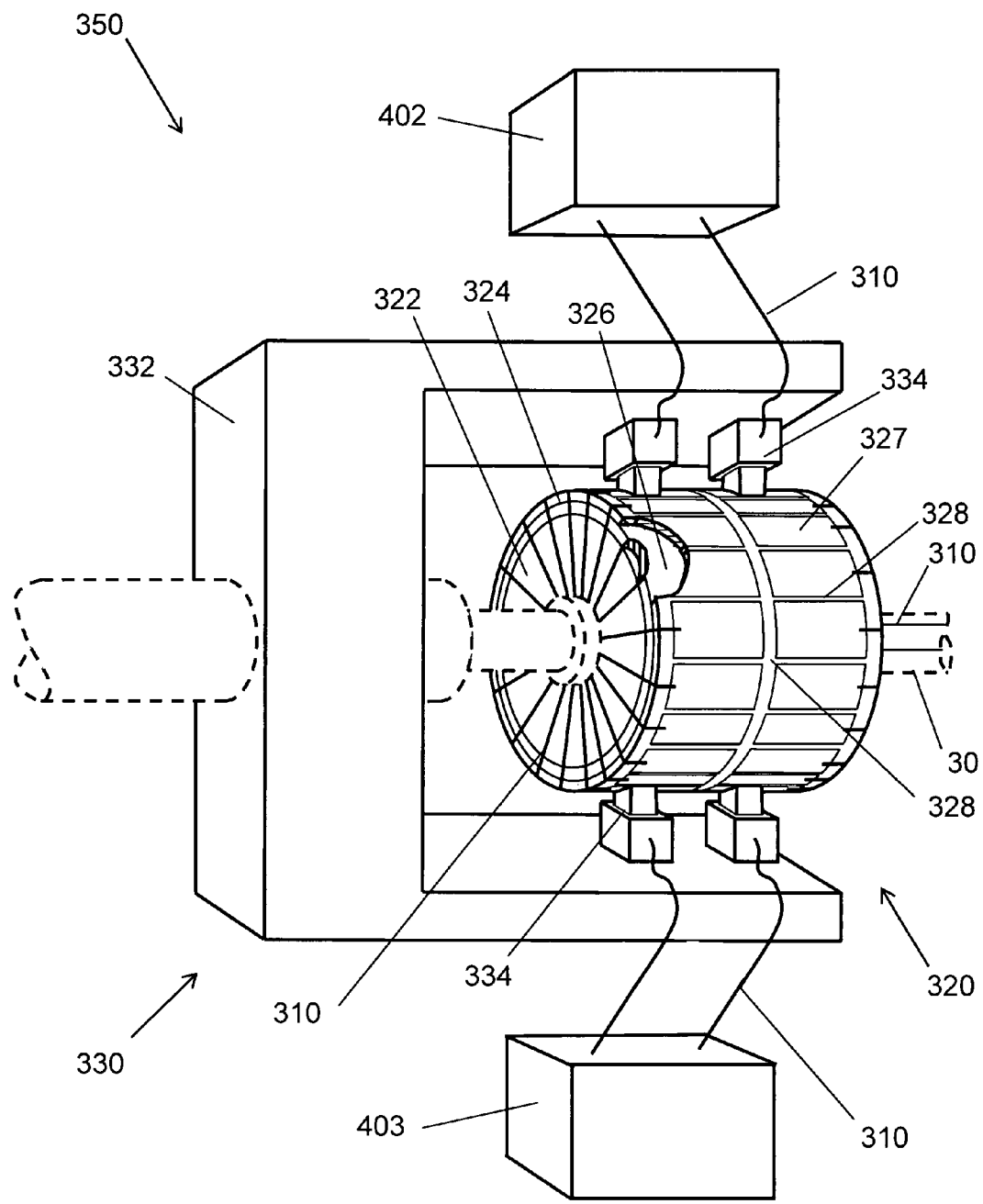

FIG. 16B shows a detail view of an energy conversion device.

Figure 16C:
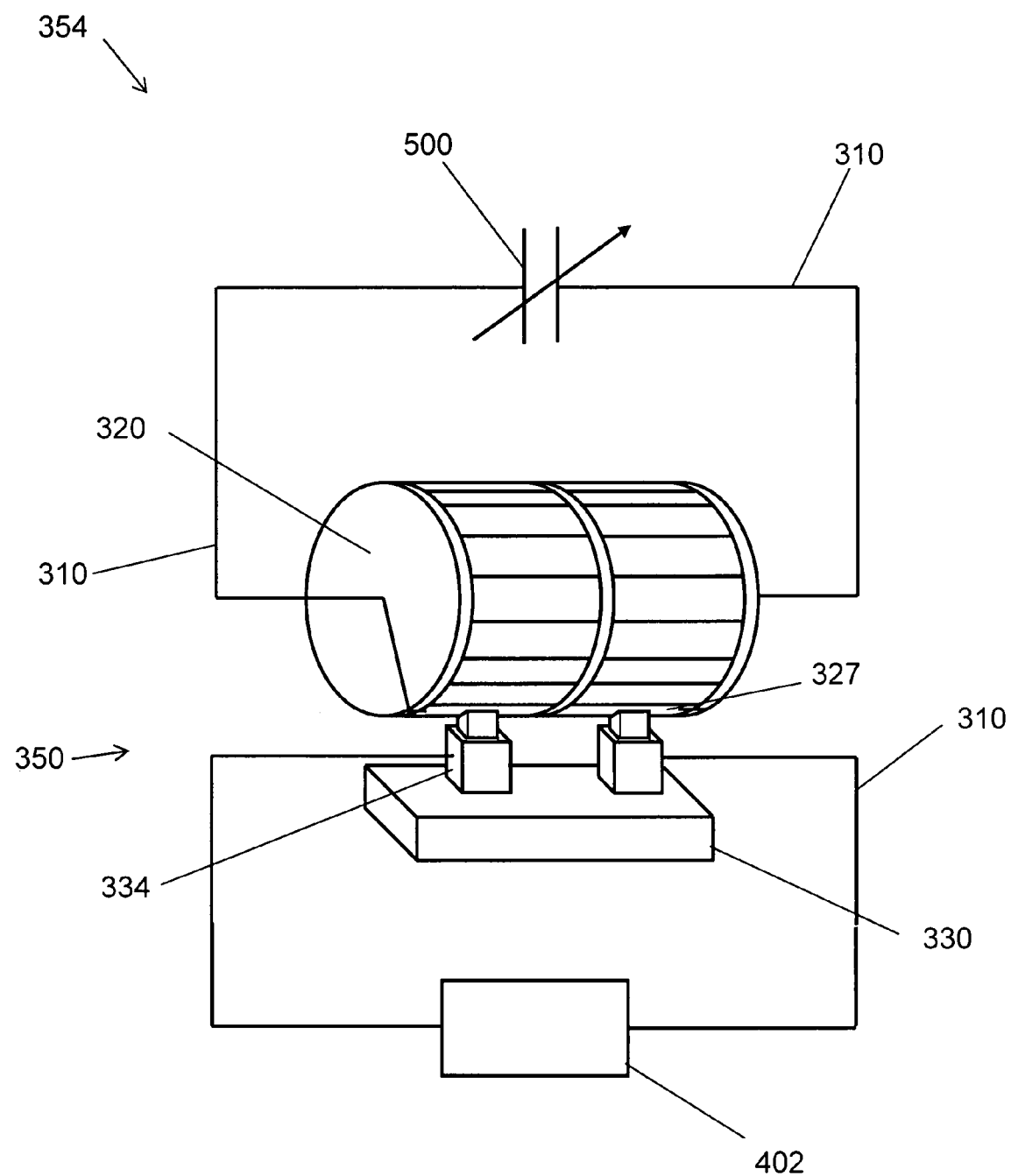

FIG. 16C shows a charge circuit

Figure 16D:
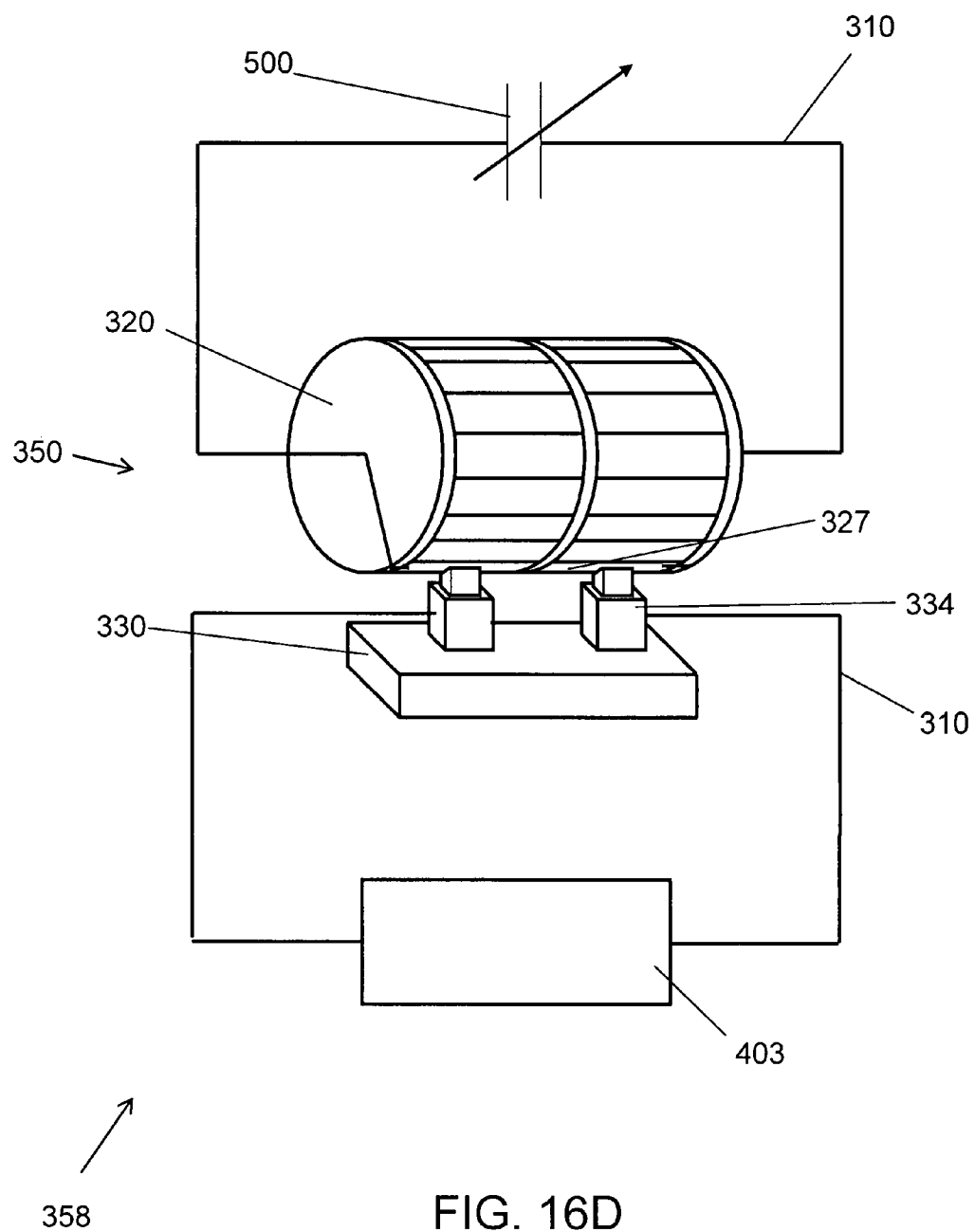

FIG. 16D shows a recovery circuit

REFERENCE NUMBER IN DRAWINGS

| 10 | Load | 20 | wheel |
|---|---|---|---|
| 30 | Axle | 32 | axis of rotation |
| 40 | Surface | 50 | vehicle |
| 55 | stationary structure | 60 | rim |
| 66 | rim outside diameter surface | 80 | internal pressure |
| 100 | flexible member | 101 | contact length |
| 102 | contact tread | 103 | undeformed sidewall |
| 104 | free tread | 108 | inside surface |
| 110 | loaded portion | 120 | unloaded portion |
| 210 | free radius | 220 | loaded radius |
| 230 | section height | 240 | loaded section height |
| 250 | section width | 255 | tread width |
| 260 | loaded section width | 265 | loaded tread width |
| 310 | electrical conduit | 320 | wheel side contact |
| 322 | base cylinder | 324 | segmented cylinder |
| 326 | insulated cylinder | 327 | conducting element |
| 328 | electrical insulation | 330 | axle side contact |
| 332 | brush base | 334 | brush assembly |
| 350 | charge exchange means | 354 | charge circuit |
| 358 | recovery circuit | 401 | input voltage |
| 402 | charge element | 403 | recovery element |
| 406 | output voltage | 413 | battery |
| 414 | step up circuit | 417 | step down circuit |
| 418 | load resistance device | 419 | storage device |
| 500 | Transducer | 502 | polymer spacer |
| 504 | top electrode | 506 | bottom electrode |
| 508 | Orthogonal direction (1) | 510 | orthogonal direction (2) |
| 511 | Orthogonal direction (3) | 512 | multiple transducer assembly |
| 513 | Belt | 514 | inside surface |
| 516 | outside surface | 520 | transducer assembly |
| 530 | Gap | 550 | energy conversion device |
| 551 | deflection mechanical energy | 560 | deflection transfer element |
| 571 | electrical energy output | 573 | electrical energy input |
| 615 | unstretched configuration | 620 | attach element |
| 625 | stretched configuration | 640 | type-1 deflection transfer element |
| 641 | Ligament | 650 | support structure |
| 652 | rigid redial element | 654 | rigid transverse element |
| 658 | transit hole | 662 | deflection transfer assembly |
| 663 | guide tube | 660 | type-2 deflection transfer element |
| 670 | fluid deflection transfer element | 672 | fluid filled container |
| 674 | Fluid | | |

DETAILED DESCRIPTION OF THE PREFERRED EMBODIMENTS

The following detailed description of the present invention is provided with respect to a few preferred embodiments. This description provides a thorough understanding of the present invention through discussion of specific details of these preferred embodiments. To those skilled in the current art, it will be apparent that the present invention can be practiced with variations to the preferred embodiments, with or with out some or all of these specific details. Well known processes, steps, and/or elements have not been described in order to focus on, and not obscure, those elements of the present invention.

Overview

Wheels can be used as a means for transporting or supporting loads. For example, four wheels are used as the means for transporting a vehicle, such as an automobile. The wheels carry the weight of the vehicle and cargo carried by the vehicle. The vehicle could also be a trailer that is pulled by an automobile. In addition, affixed to stationary structures, wheels can be used to support transported loads. For example, stationary wheels are used to support conveyor belts. Another example is stationary wheels that are used to support ski lift cables.

Wheels transport loads by rolling along a surface. The surface can be stationary or moving. The portion of the wheel that is in contact with a surface, transfers the load from the vehicle or support to the surface. These wheels comprise a rim structure and a hollow toroidal flexible member attached to the rim. Typically the flexible member is known as a tire. In typical applications air is the fluid used to fill and pressurize the volume within the flexible member and rim.

The portion of the flexible member in contact with the surface conforms to the shape of the surface. As the wheel rolls along the surface, or the surface rolls over the wheel, the portion of the wheel that initially is in contact with the surface rolls away from the surface and the adjacent portion of the flexible member contacts the surface and deforms. Mechanical energy is required to deform the flexible member.

In the present invention, electroactive polymers are used in an energy conversion device to convert the mechanical energy, from deflection of the flexible member, to electrical energy. These devices can be configured so that electrical energy is generated as the wheel rolls along the surface.

An EAP energy conversion device is comprised of a transducer, deflection transfer elements, and charge exchange means. Transducers are the active areas that provide the means for mechanical-to-electrical energy conversion. Transducers are bi-directional in that they can also convert electrical energy to mechanical energy. An energy conversion device of the present invention uses a transducer in a configuration that causes a change in electric field in response to a deflection of the transducer. The change in the electric field along with the change in transducer dimension changes the voltage of the electric field, and as a result, the electrical energy. Deflections from the tire are transferred to the transducer by deflection transfer elements.

Figure 1A:
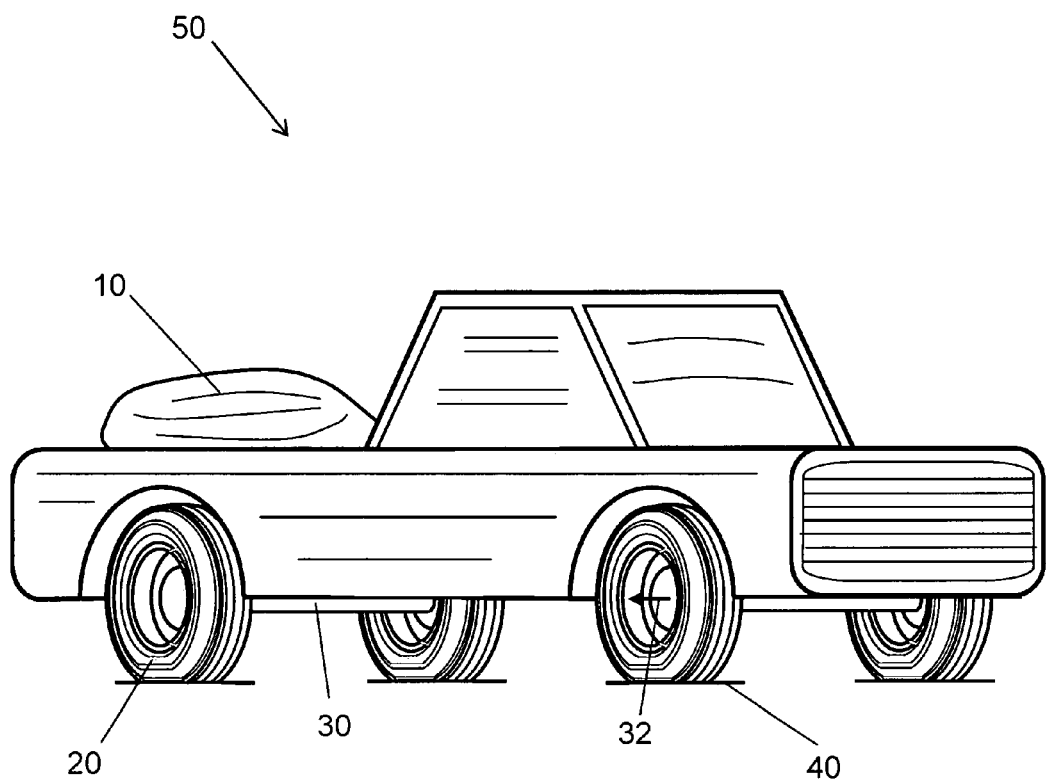
FIG. 1A shows an image of a vehicle transporting a load.
Figure 1B:
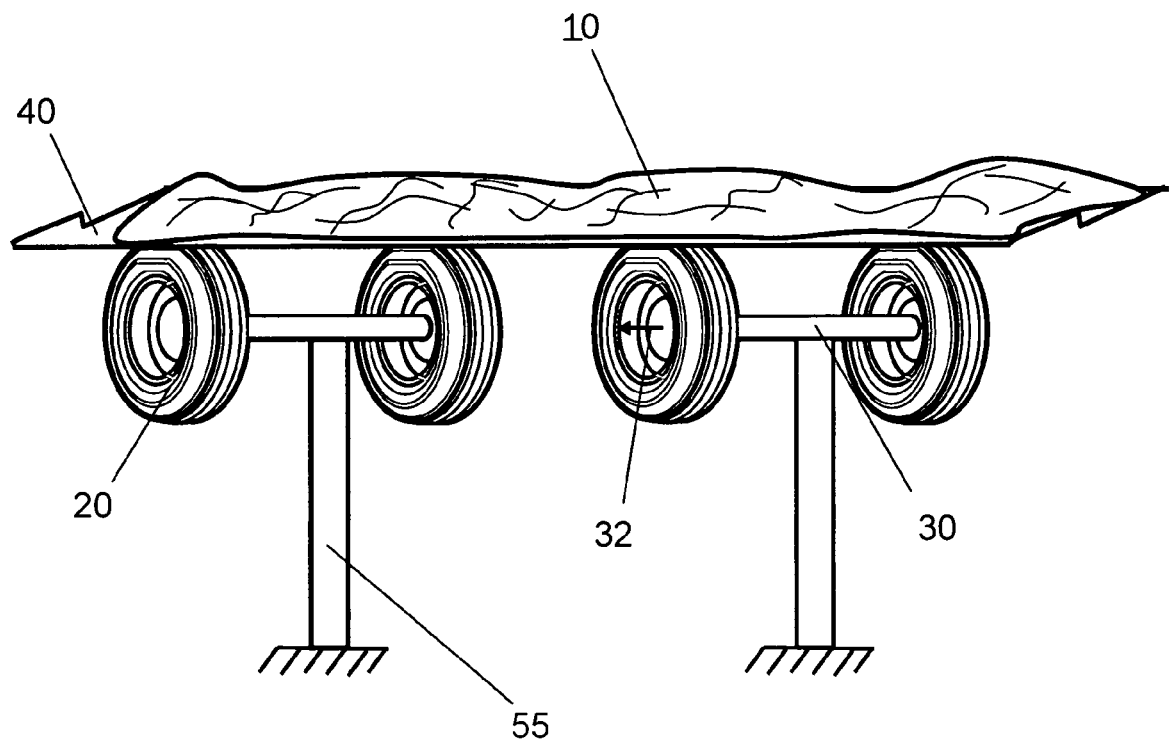
FIG. 1B shows an image of wheels affixed to a stationary structure and transporting a moving load.

Transported Loads—FIG. 1A and FIG. 1B

Wheels transport loads or support loads. FIG. 1A shows vehicle 50 supported by four wheels 20. Vehicle 50 transports load 10. The wheels 20 are affixed to vehicle 50 by axles 30. The four wheels 20 allow the vehicle 50 to be transported from one location to another by rolling over a stationary surface 40. As the wheels 20 roll over surface 40, the wheels 20 rotates around axis of rotation 32 of axle 30.

FIG. 1B shows multiple wheels 20 that are affixed to single or multiple stationary structures 55. Wheel 20 is affixed to stationary structure 55 by axle 30. Axle 30 allows wheel 20 to rotate around axis of rotation 32. Stationary structure 55 maintains the position of wheel 20 in order to support surface 40 while surface 40 is moving. Load 10 can be distributed over surface 40. An example of a wheel 20 supporting moving surface 40 is that of wheel 20 supporting a moving conveyer belt. The moving conveyer belt is the moving surface 40.

Figure 2A:
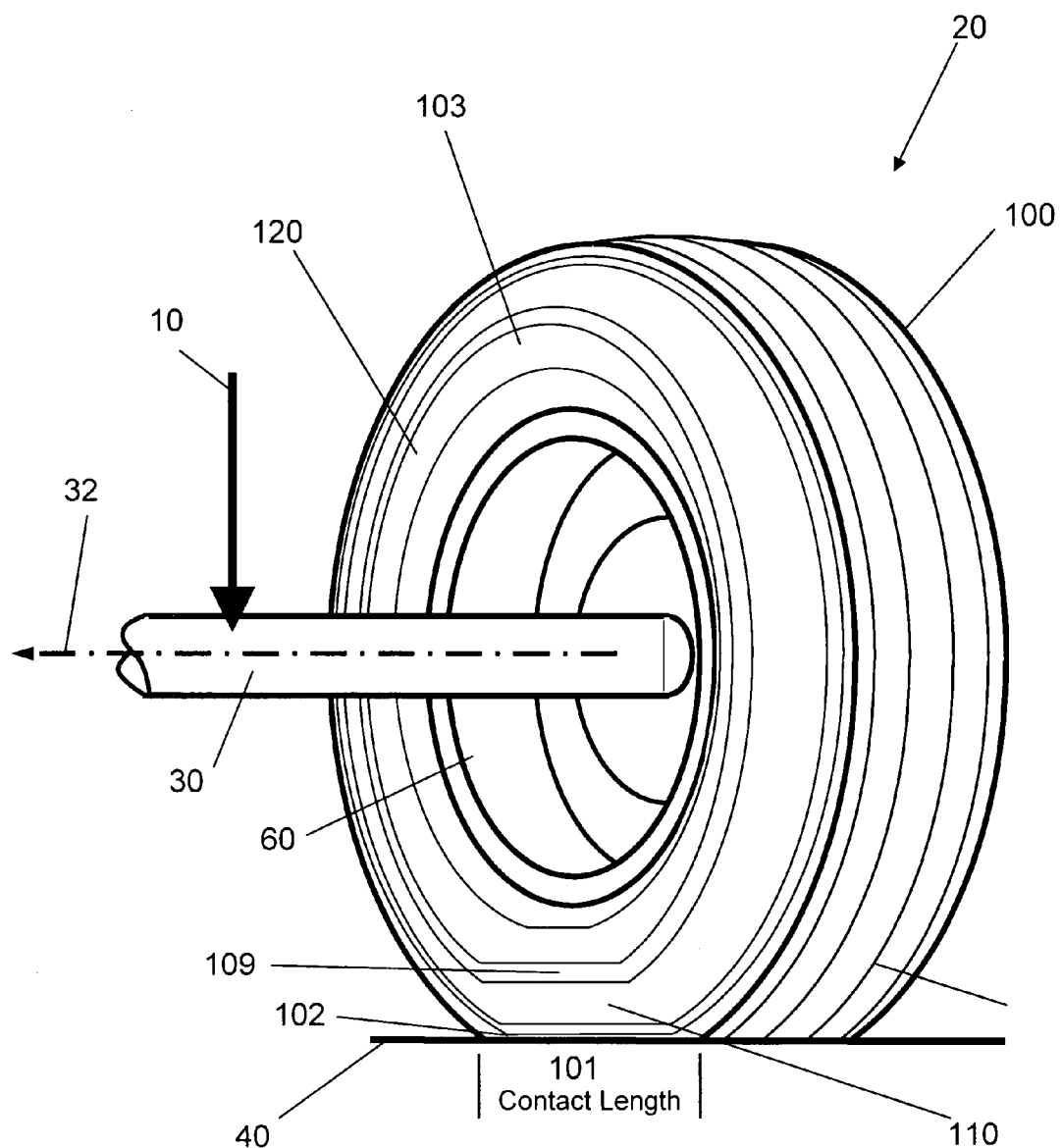
FIG. 2A shows the components of a load transporting wheel.
Figure 2B:
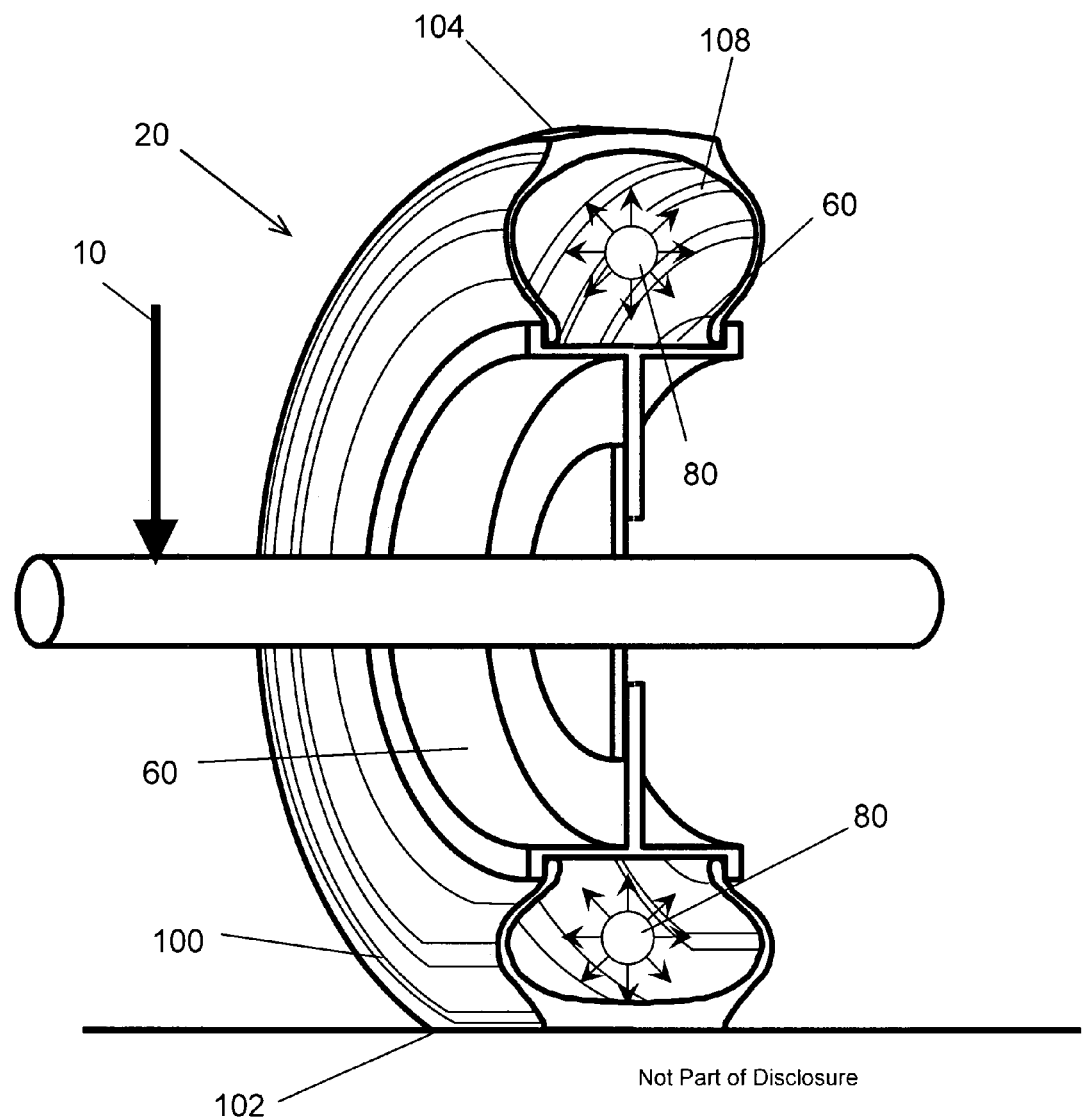
FIG. 2B shows a section view of a load transporting wheel.
Figure 2C:
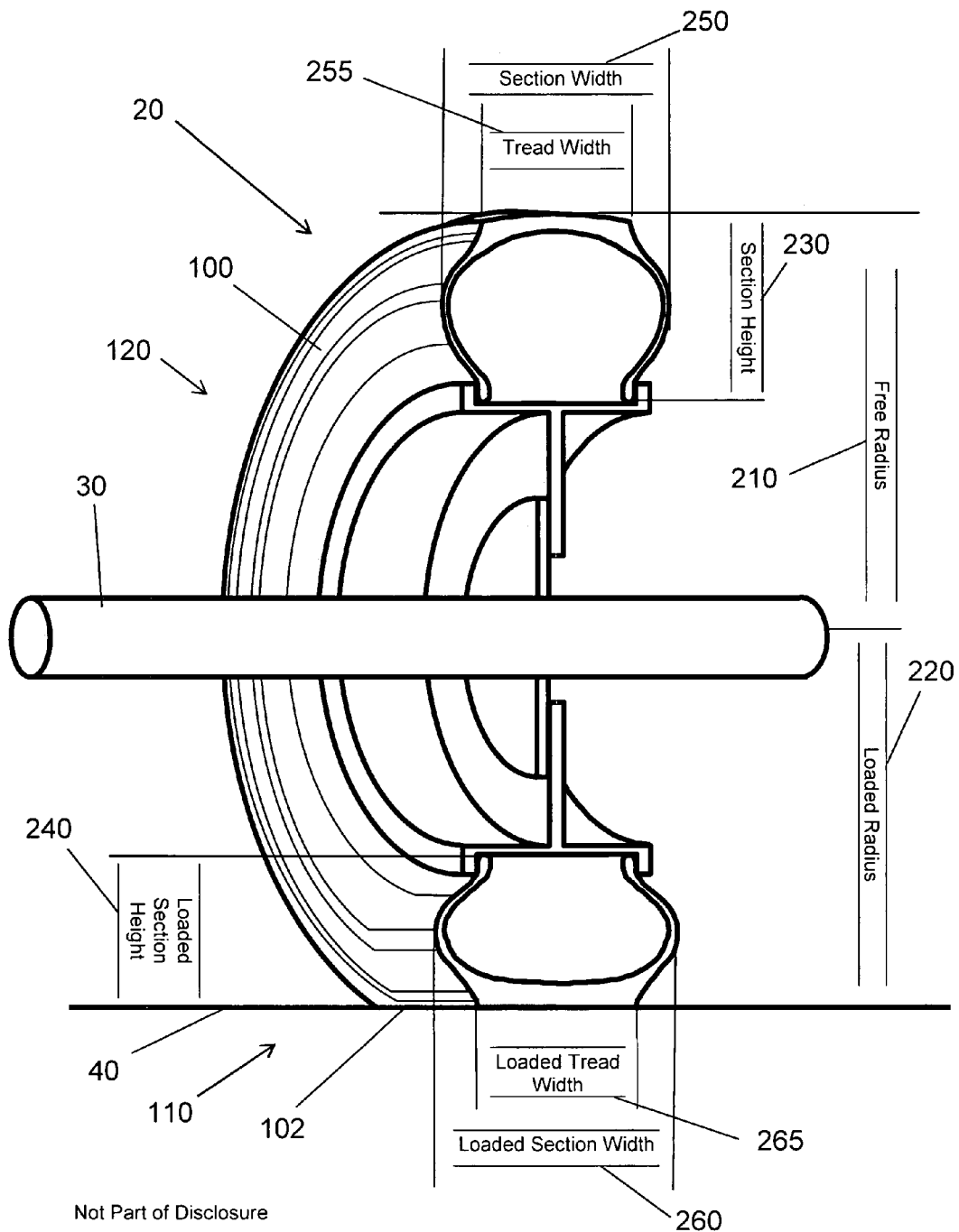
FIG. 2C shows a descriptive wheel and flexible member geometry.

Wheel Deflection Energy—FIG. 2A to FIG. 2C

FIG. 2A shows a perspective view of wheel 20 that is in contact with surface 40. Wheel 20 is comprised of toroidal shaped hollow flexible member 100 and rim 60. Axle 30 is affixed to wheel 20, through rim 60, and imparts load 10 to wheel 20. Wheel 20 rolls along surface 40 and provides a means to support and transport load 10. Flexible member 100 loaded portion 110 is positioned between surface 40 and axle 30. Flexible member 100 unloaded portion 120 is the remaining portion of flexible member 100. Loaded portion 110 includes contact tread 102 and deformed sidewalls 109. Unloaded portion 120 includes free tread 104 and undeformed sidewalls 103. Contact length 101 is the length of contact tread 102 that contacts surface 40. As wheel 20 rolls on surface 40, contact tread 102 rolls off of surface 40 to become free tread 104. Contact tread 102 is continuously changing to free tread 104 as wheel 20 rotates around axis of rotation 32 on axle 30. Load 10 follows a path from axle 30 through rim 60, through flexible member 100, and finally to surface 40.

FIG. 2B shows a section view of wheel 20. Flexible member 100 and rim 60 are configured to maintain internal pressure 80. Inside surface 108 forms a toroidal cavity of flexible member 100. Internal pressure 80 acts on inside surface 108 and rim outside diameter surface 66 to inflate flexible member 100. The internal pressure 80 provides a means for transferring load 10 from rim 60 to flexible member 100. Contact tread 102 and free tread 104 forms a continuous outside diameter surface of flexible member 100. Contact tread 102 is in contact with surface 40 over contact length.

Descriptive wheel 20 and flexible member 100 geometry elements are defined in FIG. 2C. Free radius 210 is the radius of unloaded portion 120 of flexible member 100. Loaded radius 220 is the radius of loaded portion 110 of flexible member 100. Section height 230 is the height of unloaded portion 120 of flexible member 100. Loaded section height 240 is the height of loaded portion 110 of flexible member 100. Section width 250 is the width of unloaded portion 120 flexible member 100. Tread width 255 is the width of flexible member 100 free tread 104. Loaded section width 260 is the width of loaded portion 120 of flexible member 100. Loaded tread width 265 is the width of flexible member 100 contact tread 102. Contact area is contact length 101 multiplied by loaded tread width 265. Internal pressure 80 acts on the portion of the internal surface 108, which is positioned over the contact area, and produces a force that is equivalent to transported load 10.

A definition of mechanical energy is a force multiplied by a distance. For example a pound of mass lifted one foot off the ground requires a foot pound of energy. Energy can be expressed in many different units. For example: joule, watt, and horsepower are all units of energy. A given unit of energy can be expressed in a different unit by an appropriate conversion factor. For example, one foot-pound is approximately equivalent to 1.35 joules.

Transported load 10 deflects flexible member 100 to conform to surface 40. The deflected distance is the difference between section height 230 and loaded section height 240. Mechanical energy 551 is required to deflect the tire and can be calculated as the applied force multiplied by the deflected distance.

Mechanical energy 551 is also required to deflect undeformed sidewall 103 to deformed sidewall 109. The lateral deflection is the difference between section width 250 and loaded section width 260. The total mechanical energy 551 expended in producing sidewall deflection is the deflection force, from the pressure 80 on deformed sidewalls 103, multiplied by the lateral deflection. Energy conversion device 550 of the present invention is configured to convert a portion of flexible member 100 mechanical energy 551 to electrical energy.

Figure 3:
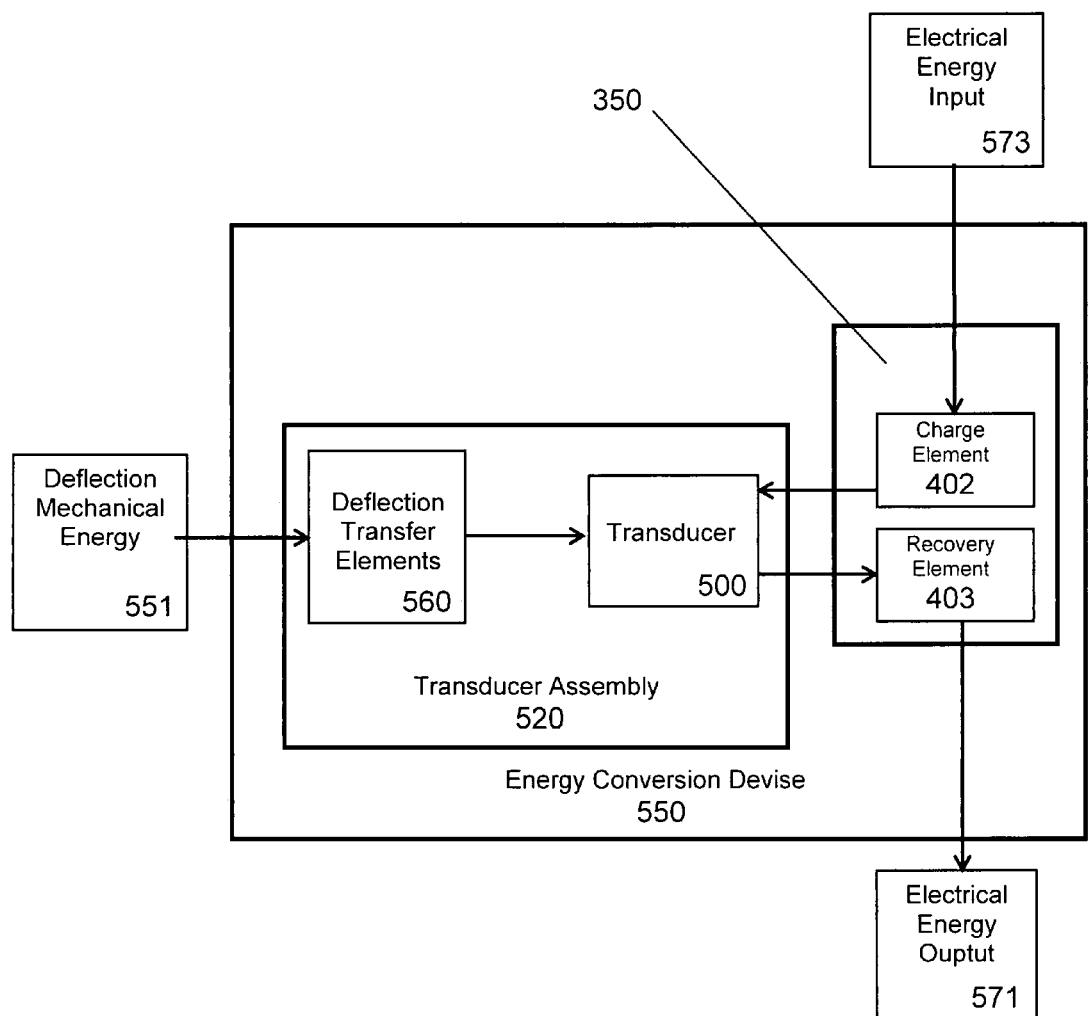
FIG. 3 shows a block diagram of the energy conversion device of the present invention.

Deflection Energy Conversion Device—FIG. 3

FIG. 3 shows a block diagram for energy conversion device 550. Deflection mechanical energy 551 and electrical energy input 573 are input energy. Electrical energy output 571 is the output energy. The energy conversion device 550 of the present invention is configured so that the electrical energy output 571 is greater than the electrical energy input 573. The electrical energy output 571 is greater than the electrical energy input 573 because energy conversion device 550 converts a portion of the deflection mechanical energy 551 to electrical energy. The electrical energy output 571 is the sum of the electrical energy input 573 plus the portion of the deflection mechanical energy 551 that is converted to electrical energy.

Energy conversion device 550 is comprised of one or more transducer assemblies 520 and one more charge exchange mean 350. The one or more transducer assemblies 520 comprise one or more deflection transfer elements 560 and one or more transducers 500. The one or more deflection transfer elements 560 transfers the deflection mechanical energy 551 from flexible member 100 to the one or more transducer 500. The one or more transducers 500 comprise assemblies of electroactive polymer materials. Charge exchange means 350 is configured to time charge and discharge of the single or multiple transducers 500 with the deflection of the loaded portion 110 and unloaded 120 portion of flexible member 100. It is possible to tune energy conversion devices 550 over ranges of frequencies and deflections that encompass those associated with the rotation of wheel 20.

Charge exchange means 350 transfers charge to and from the one or more transducers 500 based on the rotational position of wheel 20. Mechanical energy is transferred from flexible member 100 to transducer 500 through deflection transfer element 560 by stretching transducer 500. Electrical energy input 573 is transferred to transducer 500 through one or more charge elements 402. Flexible member 100 then causes transducer 500 to return to its unstretched state. Charge exchange means 350 then transfers electrical energy output 571 from transducer 500 through recovery element 403

Figure 4:
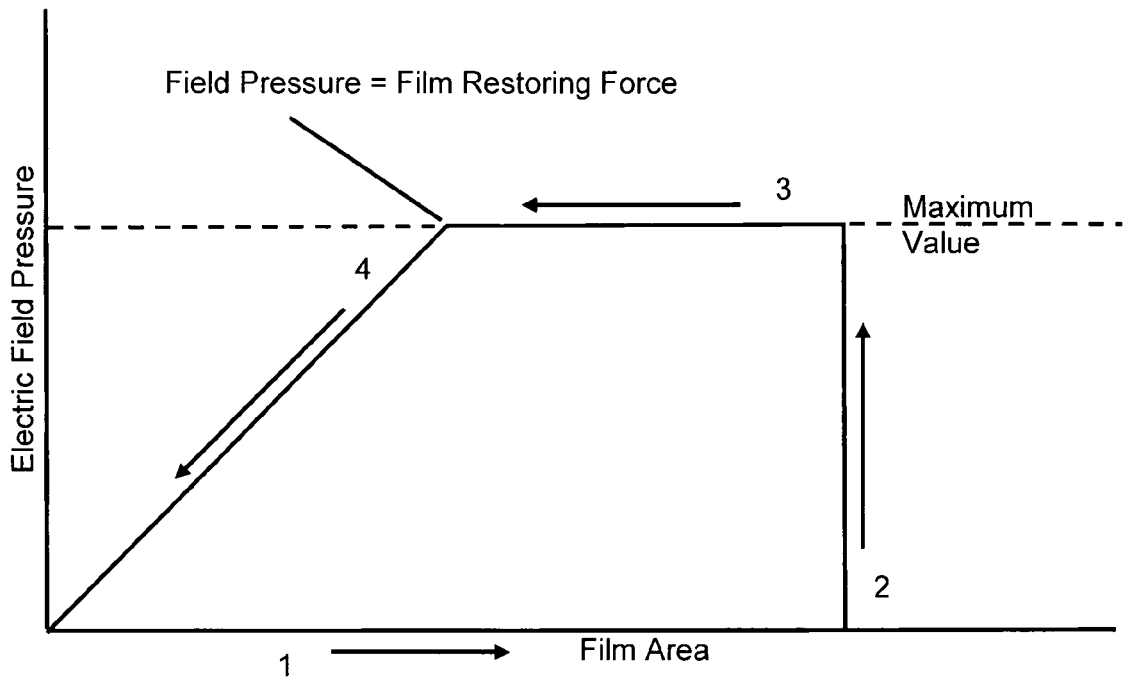
FIG. 4 shows a diagram of an electroactive polymer generator cycle.

Energy Recovery Cycle—FIG. 4

FIG. 4 shows a cycle for recovering deflection energy that that employs an electroactive polymer transducer of the present invention. This cycle is shown for illustrative purposes only. Many different cycles could be employed for the present invention.

A representative energy recovery cycle is comprised of four segments. In Segment 1 an electroactive polymer film contains zero or low electric field pressure and mechanical force pulls the film to a stretched configuration. In Segment 2, the electric field pressure on the film is increased to a maximum value. Charge exchange means 350 is required to perform this function. In Segment 3 the film is relaxed, to where the restoring force of the stretched film equals the external force from the electrical field pressure. The electric field pressure remains near its maximum value. As the electroactive polymer film relaxes, the electrical energy on the film increases because the electroactive polymer film restoring force returns the film to its original thickness. The electrical energy increase is manifest in the form of a voltage increase. The increase in the charge's energy is harvested in the form of electric current flow. In Segment 4 the electroactive polymer film fully relaxes as the electric field pressure is reduced to zero and all of the electrical energy is recovered.

Figure 5A:
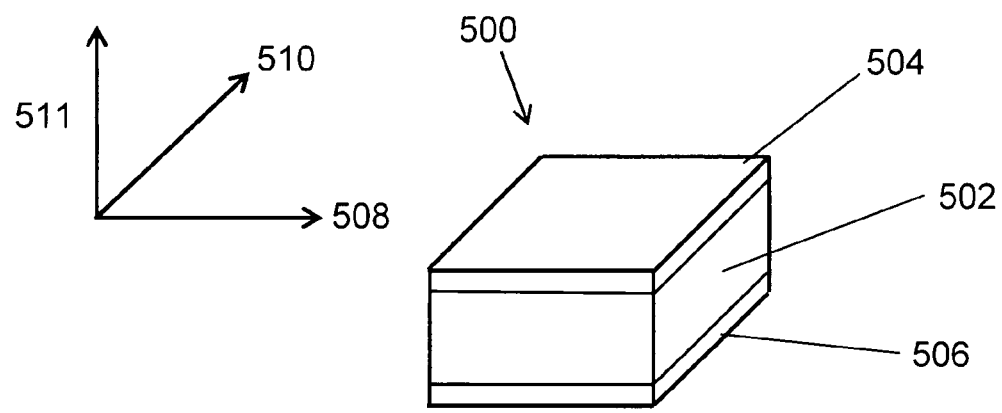
FIG. 5A shows an unstretched electroactive polymer transducer.
Figure 5B:
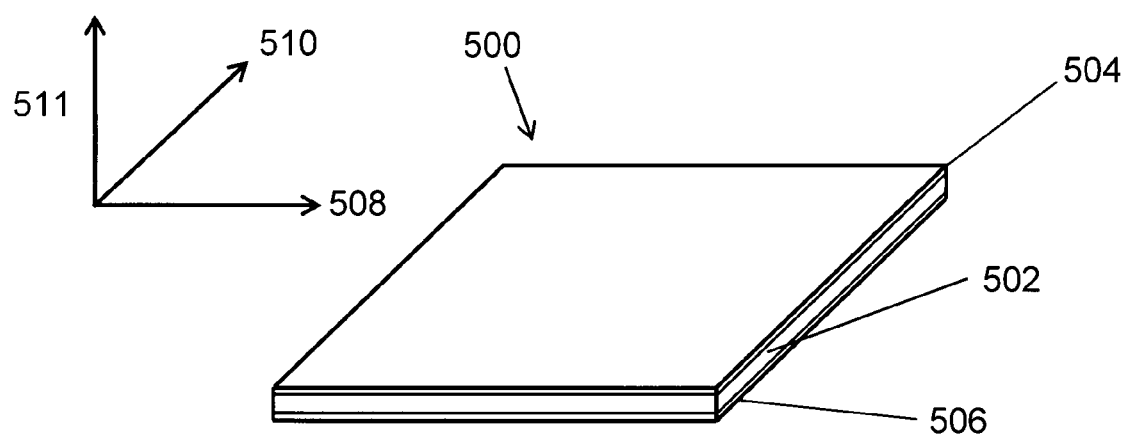
FIG. 5B shows a stretched electroactive polymer transducer.

Electroactive Polymer Transducers—FIG. 5A and FIG. 5B

FIG. 5A shows an unstretched transducer 500. FIG. 5B shows a stretched transducer 500. Transducer 500 is comprised of a top electrode 504, bottom electrode 506 and polymer spacer 502. Polymer spacer 502 is placed between top electrode 504 and bottom electrode 506. Top electrode 504 and bottom electrode 506 are affixed to polymer spacer 502. Polymer spacer 502 is an elastomeric material that is an electrical insulator with dielectric properties, Top electrode 504, and bottom electrode 506 are comprised of elastomeric electrically conductive materials.

Transducer 500 functions as a variable capacitor. A capacitor is defined as two conducting electrodes separated by a dielectric, electrically insulating medium. One of the electrodes corresponds to top electrode 504. The other electrode corresponds to bottom electrode 506. The dielectric, electrically insulating medium corresponds to polymer spacer 502. The capacitance C of a parallel plate capacitor can be described as $C=\epsilon_o kA/T$. Where $\epsilon_o$ is the electrical permittivity constant, k is the dielectric constant of nonconducting medium, A is the area of the capacitor and T is the thickness of the nonconducting medium. The capacitance of a capacitor is proportional to the electrode surface area divided by the distance between the electrodes. Placement of a dielectric material between the electrodes increases the capacitance. Increasing the electrode surface area and reducing the distance between the electrodes increases the capacitance. Conversely, reducing the electrode surface area and increasing the distance between the electrodes reduces the capacitance.

FIG. 5A and FIG. 5B show a means by which transducer 500 converts mechanical energy to electrical energy. FIG. 5A shows transducer 500 in unstretched configuration. In FIG. 5B, transducer 500 is mechanically stretched by external forces to a larger area in a plane defined by 508 and 510 and thinner in the direction defined 511. An electric charge is applied to electrodes 504 and 506 of transducer 500 in the stretched configuration. The applied charge results in a voltage difference between electrodes 504 and 506.

The resulting electrostatic force is insufficient to balance the elastic restoring forces of the stretch stretched polymer. As the external force is released, transducer 500 contracts to a smaller planar area in directions 508 and 510 and becomes thicker in direction 511 as shown in FIG. 5A. Reducing the planar area in directions 508 and 510 and increasing the distance between electrodes 504 and 506 reduces the capacitance and as a result, raises the electrical energy and voltage of the charge. That is, mechanical deflection is turned into electrical energy and transducer 500 is acting as a generator.

The increase in electric energy, U, can be illustrated by $U=0.5Q^2/C$, where Q is the amount of positive charge on the electrodes and C is the capacitance. If Q is fixed and C decreases, the electrical energy U increases The increase in electrical energy in the form of increased voltage can be recovered and stored or used. Thus, transducer 500 converts mechanical energy to electrical energy when it contracts. Some or all of the charge can be removed when transducer 500 is fully contracted. Alternately, some or all of the charge can be removed during contraction.

If the electric field pressure in the polymer increases and reaches balance with the mechanical elastic restoring force and external load during contraction, the contraction will stop before full contraction, and no further elastic mechanical energy will be converted to electrical energy. Removing some of the charge and stored electrical energy reduces the electrical filed pressure, thereby allowing contraction to continue. Thus removing some of the charge may further convert mechanical energy to electrical energy. The exact electrical behavior of transducer 500 when operating as a generator depends on any electrical and mechanical loading as well as the intrinsic properties of polymer spacer 502 and electrodes 504 and 506.

Many polymers are commercially available for use as transducer materials. The materials used in transducer applications can have linear strain capacities of at least one hundred percent. Further, some of these materials can have linear strain capacities between two hundred and four hundred percent. Linear strain is defined in this application as the deflected distance per unstretched length along the direction of applied load. The deflected distance is the difference between the stretched length and unstretched length. It is also desirable that these materials are reversible over the range of strain. In other words, it is preferred that they return to their unstretched length after the applied load is removed. Some of the materials that are currently available include: silicone elastomers, thermoplastic elastomers, acrylic elastomers, polyurethanes and fluoroelastomers. This list is not intended to cover all possible suitable transducer materials and is provided as examples to show possible materials. There are many other possible transducer materials. Various types of materials suitable for use in transducers with the present invention are described by Pelrine et al. in U.S. Pat. No. 6,768,246.

Various types of electrode materials suitable for use in the present invention are described by Pelrine et al. in U.S. Pat. No. 6,768,246. Materials suitable use in an electrode for the present invention include; graphite, carbon black, thin metals such as gold and silver, gel and polymers grease suspended metals, graphite, or carbon and conductive grease.

Transducer Assembly—FIG. 6A to FIG. 9C

Figure 6A:
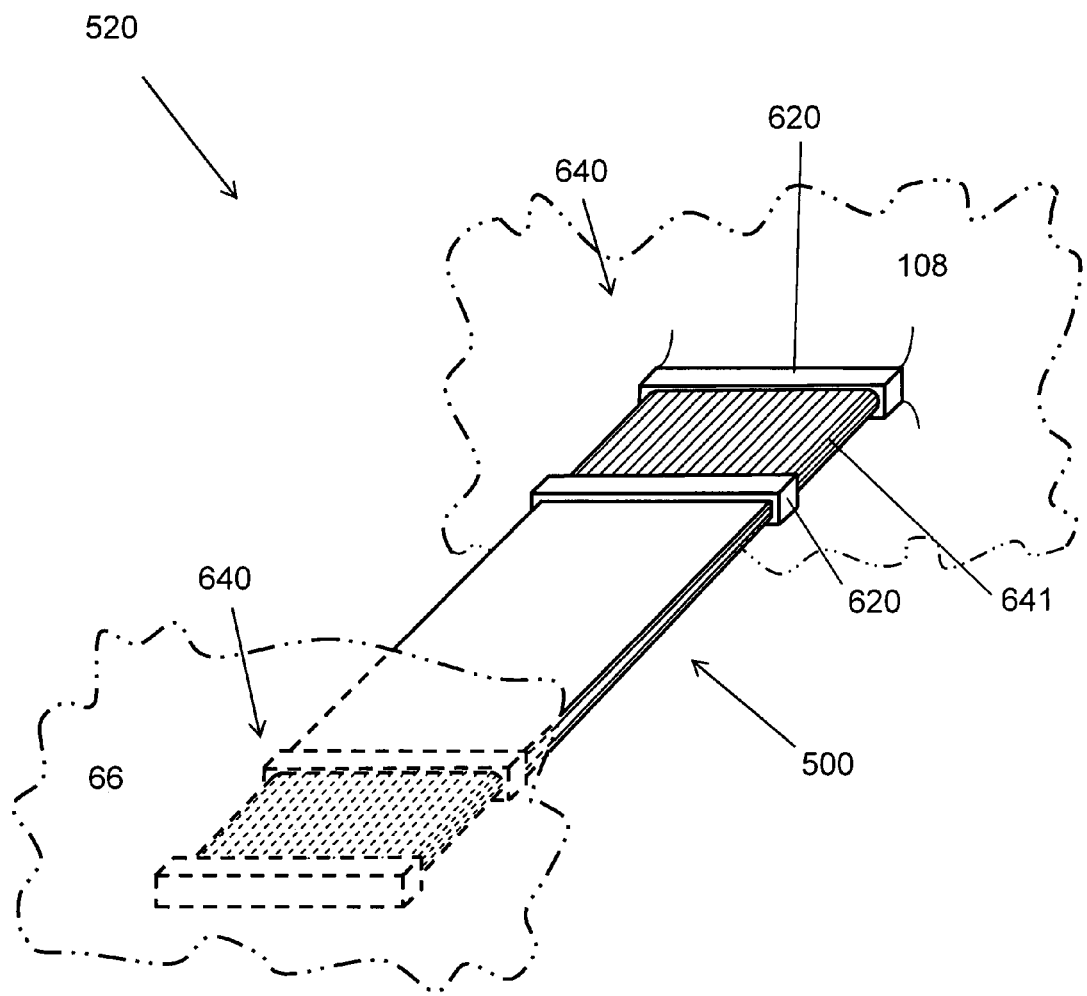
FIG. 6A shows a transducer assembly with two type-1 deflection transfer elements.

FIG. 6A shows transducer assembly 520. Transducer assembly 520 is comprised of transducer 500 and two type-1 deflection transfer elements 640. The two type-1 deflection transfer elements 640 extend from opposite ends of transducer 500.

Type-1 deflection transfer element 640 is comprised of ligament 641 and two attach elements 620. An attach element 620 is affixed to each end of ligament 641. One end of a type-1 deflection transfer element 640 is attached to transducer 500 with attach element 620. The opposite end of type-1 deflection transfer element 640 is attached to the inside surface 108 of flexible member 100 or attached to outside surface 66 of rim 60 with attach element 620. Attach element 620 can be affixed to ligament 641, outside diameter surface 66, and inside surface 108 with mechanical fasteners such as screws, bolts, rivets or bonded with an adhesive. Ligament 641 can apply only tensile forces to transducer 500. This means that ligament 641 transfer deflections from flexible member 100 by stretching transducer 500. Ligament 641 can be essentially plainer as shown in FIG. 6A or ligament 641 can be long and slender with a circular, elliptical, or square cross section.

Figure 6B:
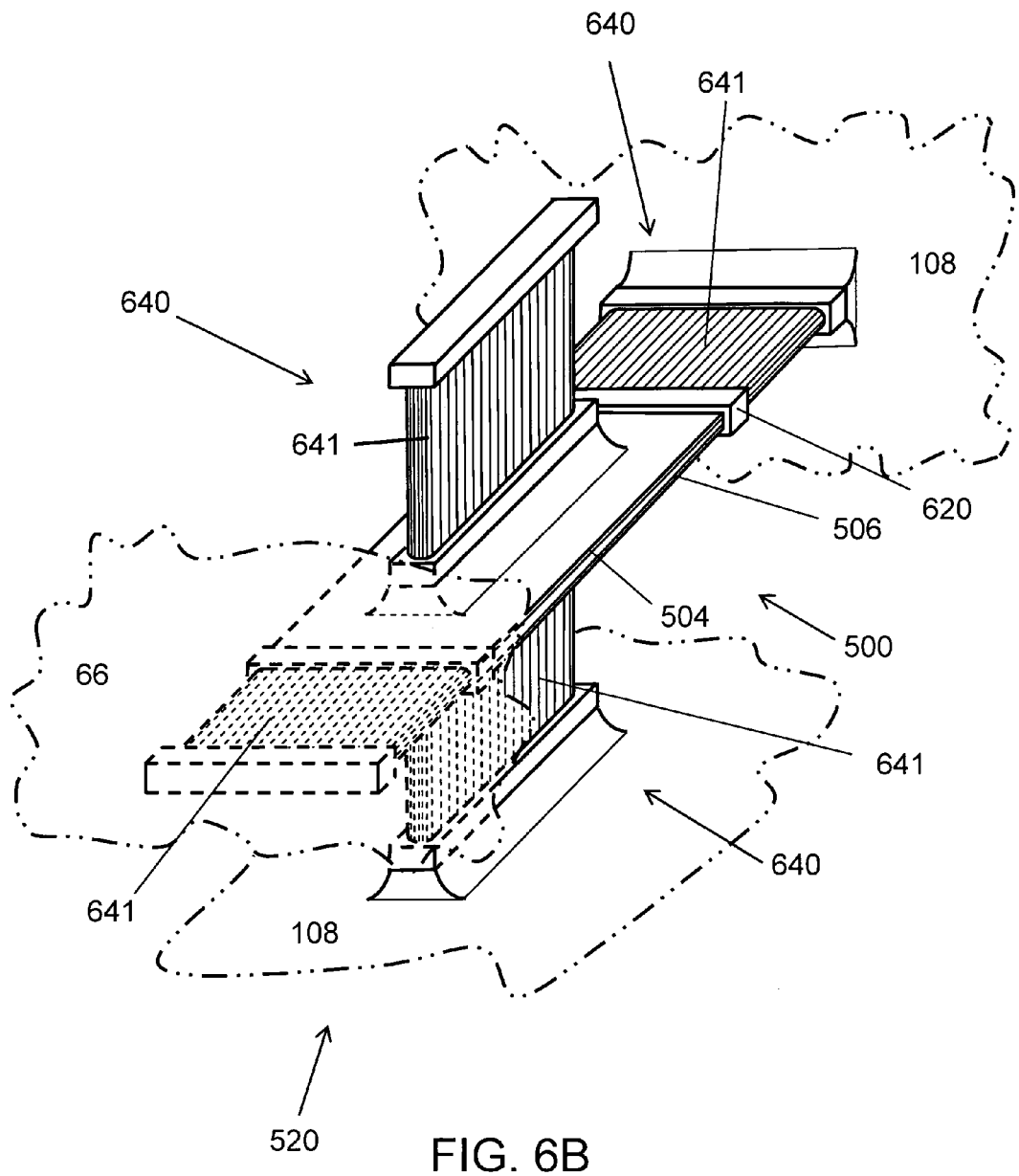
FIG. 6B shows a transducer assembly with four type-1 deflection transfer elements.

The above type-1 deflection transfer element 640 is one example of many possible configurations. This description is for illustrative purposes only and not meant to cover all possible type-1 deflection transfer element 640 configurations. FIG. 6B shows transducer assembly 520 in a configuration that has four type-1 deflection transfer elements 640 extending from transducer 500. Two type-1 deflection transfer elements 640 extend from opposite edges of transducer 500 and two type-1 deflection transfer elements 640 extend from electrodes 504 and 506. One of the type-1 deflection transfer elements 640 that extends form an edge of transducer 500 and attaches to inside surface 108 and the other type-1 deflection transfer element extends and attaches to rim outside diameter surface 66. The two type-1 deflection transfer elements 640 that extend from electrodes 504 and 506 extend to the inside surfaces 108 of opposite deformed sidewalls 109 or undeformed sidewalls 103.

FIG. 7A shows a section view of wheel 20 with transducer assembly 520 in a radial orientation. The transducer assembly 520 located in unloaded portion 120 of flexible member 100, as shown in the upper cross section, is in stretched configuration 625. Transducer assembly 520 in loaded portion 110 of flexible member 100, as shown in the lower cross section, is in unstretched configuration 615.

FIG. 7B shows an enlarged view of the upper cross section. Transducer 500 in stretched configuration 625 is in the unloaded portion 120 of flexible member 100. One type-1 deflection transfer element 640 attaches to flexible member 100 inside surface 108 and the other attaches to rim 60 outside diameter surface 66.

FIG. 7C shows transducer 500 in unstretched configuration 615 and is located at the center of contact tread 102 in the loaded portion 110 of flexible member 100. One type-1 deflection transfer element 640 attaches to flexible member 100 inside surface 108 and the other attaches to rim 60 outside diameter surface 66.

An alternate configuration for transducer assembly 520 is shown FIG. 8A. This shows a section view of wheel 20 with energy recovery 520 in lateral orientation. The transducer assembly 520 in unloaded portion 120 of flexible member 100, as shown in the upper cross section, is in unstretched configuration 615. Transducer assembly 520 loaded portion 110 of flexible member 100, as shown in the lower cross section, is in stretched configuration 625.

FIG. 8B shows an enlarged view of the upper cross section. Transducer 500 in unstretched configuration 615 is in the unloaded portion 120 of flexible member 100. The two type-1 deflection transfer elements 640 are attached to facing inside surfaces 108 of undeformed side walls 103.

FIG. 8C shows an enlarged view of the lower cross section. Transducer 500 is in stretched configuration 625 and is located at the center of contact tread 102 in loaded portion 110 of flexible member 100. The two type-1 deflection transfer elements are attached to inside surface 108 of deformed sidewalls 109.

Still another configuration for transducer assembly 520 is shown in FIG. 9A. FIG. 9A shows a section view of wheel 20 with a transducer assembly 520 that has four type-1 deflection transfer elements 640. Two type-1 deflection transfer elements 640 extend from opposite ends of transducer 500 in the radial direction. One of these deflection transfer elements 640 is attached to inside surface 108. The other deflection transfer element 640 attaches to outside surface 66 of rim 60. Two type-1 deflection transfer elements 640 extend from electrodes 504 and 506 in opposite directions.

FIG. 9B shows an enlarged view of an unloaded portion 120 of flexible member 100. Transducer assembly 520 is in stretched configuration 625. The two type-1 deflection transfer elements 640 that extend in directions parallel to 511 from electrodes 504 and 506 attach to the facing inside surfaces 108 of undeformed sidewalls 109. The lengths of these deflection transfer element 640 are sized to allow transducer 500 to fully contract when flexible member 100 is undeformed.

FIG. 9C shows an enlarged view of a loaded portion 110 of flexible member 100. Transducer assembly 520 is in unstretched configuration 615 in the plain defined by direction 508 and 510. The two deflection recovery elements 640, that extend from electrodes 504 and 506, stretch transducer 500 along direction 511. This increases the separation between electrodes 504 and 506 and as a result, the electrical energy.

Multiple Transducer Assembly—FIG. 10 to FIG. 13C

FIG. 10 shows multiple transducer assembly 512. Multiple transducer assembly 512 is comprised of multiple transducers 500 assembled on belt 513 of polymer spacer 502. Multiple transducer assembly 512 has an inside surface 514 and an outside surface 516. Multiple electrodes top electrodes 504 and multiple bottom electrodes 506 are positioned on inside surface 514 and outside surface 516 of multiple transducer assembly 512. For example, in one arrangement, multiple top electrodes 504 are affixed to inside surface 514 of multiple transducer assembly 512, and an equal number of bottom electrodes 506 are affixed to outside surface 516 of multiple transducer assembly 512. Each top electrode 504 is aligned with a bottom electrode 506. Each aligned top electrode 504 and bottom electrode 506; separated by polymer spacer 502 of belt 513 constitute a single transducer 500. Gap 530 separates transducers. The length and width of gap 530 is sufficient to provide electrical isolation between adjacent transducers 500.

Top electrodes 504 can be on either inside surface 514 or outside surface 516 of multiple transducer assembly 512. Likewise, bottom electrode 506 can also be on either surface. In addition, any combination of top electrodes 504 and bottom electrodes 506 can be placed on outside surface 516 or inside surface 514.

FIG. 11A shows a section view of wheel 20 with an embodiment of the current invention where multiple transducer assembly 512 is affixed to support structure 650. Single or multiple type-1 deflection transfer elements 640 transfer deflections from flexible member 100 to multiple transducer assembly 512. Support structure 650 is affixed to rim 60.

FIG. 11B shows an enlarged view unloaded portion 120 of flexible member 100. Support structure 650 is comprised of rigid transverse element 654 and rigid radial element 652. Rigid transverse element 654 is affixed to rigid radial element 654. Rigid radial element 652 is affixed to rim 60. Single or multiple transit holes 658 perforate rigid transverse element 654. Multiple transducer assembly 512 is affixed to outside diameter surface of rigid transfer element 654. Single or multiple type-1 deflection transverse elements 640 extend from the outside surface 516 of multiple transducer assembly 512 to inside surface 108 of flexible member 100. The single or multiple type-1 deflection transfer elements 640 are positioned on multiple transducer assembly 512 over the single or multiple transit holes.

Unloaded portion 120 of flexible member 100 is at section height 230. In the section height 230 configuration, flexible member 100 pulls the single or multiple type-1 deflection transfer elements 640. The single or multiple type-1 deflection transfer elements 640, in turn, pull multiple transducer assembly 512 away from rigid transverse element 654. This places the single or multiple transducers 500 in stretched configuration 625.

FIG. 11C shows an enlarged view of a loaded portion 110 of flexible member 100. Flexible member 100 has loaded section height 240. The single or multiple type-1 deflection transfer elements 640 are loose and allow the single or multiple transducers 500 on transducer assembly 512 to return to unstretched configuration 615.

FIG. 12A shows a section view of wheel 20 flexible member 100 with an embodiment of the current invention where multiple transducer assembly 512 is affixed to rigid transverse element 654 inside diameter surface. Single or multiple deflection transfer assemblies 662 are aligned with transit holes 658 and affixed to the outside diameter surface of rigid transverse element 654.

FIG. 12B shows an enlarged view of unloaded portion 120 of flexible member 100. A deflection transfer assembly 662 is affixed over each transit hole 658. Included in FIG. 12B is a section view of deflection transfer assembly 662. A deflection transfer assembly 662 is comprised of guide tube 663 and type-2 deflection transfer element 660. Guide tube 663 is affixed to rigid transverse element 654 and is aligned with a transit hole 658. Type-2 deflection transfer element 660 of deflection transfer assemblies 662 extends away from outside surface 516 of multiple transducer assembly 512 normal to the surface of multiple transducer assembly 512. Guide tube 663 assures that type-2 deflection transfer element travels along the axis of guide tube 663 in the direction normal to the outside surface 516 of multiple transducer assembly 512. Type-2 deflection transfer element 660 is comprised of a rigid material of sufficient strength to transfer the loads from deflection of flexible member 100 to multiple transducer assembly 512. The cross section of type-2 deflection transfer element can be circular, elliptical, square, rectangular or any other cross section.

In FIG. 12B, flexible member 100 is undeformed and type-2 deflection transfer elements 660 are not in contact with inside surface 108. Guide tube 663 secures the type-2 deflection transfer element 660 to the outside surface 516 of multiple transducer assembly 512 while type-2 deflection transfer element 660 is unloaded.

FIG. 12C shows loaded portion 110 flexible member. Loaded portion 110 of flexible member 100 inside surface 108 is in contact with multiple type-2 deflection transfer elements 660. Flexible member 100 pushed the multiple type-2 deflection transfer elements 660 into multiple transducer assembly 512, stretching the individual transducers 500. Guide tube 663 maintains the position and constrains travel of the type-2 deflection transfer elements 660 to be normal to outside surface 516 of multiple transducer assembly 512. This assures that multiple transducer assembly 512 stretches to an optimized level for efficient energy recovery.

FIG. 13A shows a section view of wheel 20 with an embodiment of the current invention that includes fluid type deflection transfer element 670. Fluid type deflection transfer element 670 is affixed to the outside surface of rigid transverse element 654 and inside surface 108 of flexible member 100. Multiple transducer assembly 512 affixed to rigid transverse element 654. Fluid deflection transfer element 670 is comprised of fluid container 672 and fluid 674

As shown in FIG. 13B, where fluid type deflection transfer element 670 is aligned with the unloaded portion 120 of flexible member 100. Fluid filled container 672 is uncompressed and all of the fluid 674 is contained within fluid container 672 by multiple transducer assembly 512.

As shown in FIG. 13C, when fluid type deflection transfer element 670 is aligned with the loaded portion 110 of flexible member 100, fluid container 672 is compressed. A portion of fluid 674 is forced out of fluid filled container 672 through the multiple transit holes 658 and deforms multiple transducer assembly 512. This stretches transducers 500 of multiple transducer assembly 512. Fluid type deflection transfer element 670 can be aligned with a single on multiple transit holes 658. Representative fluids 674 are water, air, oil or combinations of fluids. Possible fluids types are not limited to those listed.

Fluid filled container 672 can be made of a plastic, a metal such as stainless steel or aluminum, or any other rigid material with sufficient compliance to allow for the required deflection.

Electrical Circuits—FIG. 14 to FIG. 16D

In the present invention electrical energy input 573 and deflection mechanical energy 551 is applied to a transducer 500 in a manner that allows electrical energy output 571 to be greater than electrical energy input 573. The mechanical energy 551 to electrical energy conversion generally requires charge exchange to and from transducer 500 to coincide with stretched configuration 625 and relaxed configuration 615.

FIG. 14 shows a block diagram of charge exchange means 350 of energy conversion device 550. Electrical energy input 573, in the form of input voltage 401, is transferred to transducer 500 through charge element 402 after deflection mechanical energy 551, from wheel rotation, is added. Mechanical energy 551 is added by stretching transducer 500 to stretched configuration 625. After addition of electrical energy input 573, transducer returns to unstretched configuration 615. Returning transducer 500 to unstretched configuration 615 causes the electrical energy input 573 on transducer 500 to increase to output voltage 406. The output voltage 406 flows through recovery element 403 to electrical energy output 571. Charge exchange means 350 controls the flow of electrical energy input 573 through charge element 402 to transducer 500. And charge exchange means 350 controls flow of electrical energy output 571 through recovery element 403. The control of electrical energy flow by charge exchange means 350 is based on the rotation of wheel 20.

The position of a transducer 500, in stretched configuration 625 or unstretched configuration 615, depends on the location of the transducer assembly 520 in toroidal shaped hollow flexible member 100 of wheel 20. For example at time $t_1$, in a particular arrangement, transducer assembly 520 is located in the unloaded portion 110 of flexible member 100 of wheel 20. The transducer 500, of transducer assembly 520, is in stretched configuration 625. At a later time $t_2$, wheel 20 has rotated so that flexible member 100 loaded portion 110 becomes unloaded portion 120. This causes transducer 500 to return unstretched configuration 615. The above description of transducer assembly 520 arrangements in flexible member 100 is for illustrative purposes only and is intended to illuminate the relationship between transducer 500 stretching and flexible member 100 deflection. There are many other possible transducer 500 to flexible member 100 arrangements that are not covered by this description.

Charge circuit 354 is formed, at $t_1$ when transducer 500 is in stretched configuration 625. Formation of charge circuit 354 is caused by rotation of wheel 20 to a position that causes transducer 500 to achieve stretched configuration 625 and by making electrical connection between transducer 500 and charge element 402. Formation of charge circuit 354 causes electrical energy input 573 to flow to transducer 500 through charge element 402.

Electrical energy input 573 is added to transducer 500 in stretched configuration 625 in the form of input voltage 401. After input electrical energy 573 is added to transducer 500, charge circuit 354 is broken. Charge circuit 354 is broken because the continued rotation of wheel 20 results in breaking of the transducer 500 to charge element 402 electrical connection. The electrical energy input 573 remains on stretched transducer 500 after the charge circuit 354 is broken.

Continued rotation of wheel 20 causes formation of recovery circuit 358 at a later time $t_2$. The formation of recovery circuit 358 is caused by rotation of wheel 20 to a position that causes transducer 500 to return to unstretched configuration 615 and by making electrical connection between transducer 500 recovery element 403.

Formation of the recovery circuit 358 causes the electrical energy to flow from transducer 500 to recovery element 403 in the form electrical output 571. Return of transducer 500 to unstretched configuration 615 increases the electrical energy input 573 to a higher energy level. This higher energy level is the electrical energy output 571.

FIG. 15A shows a representative diagram for charge element 402. Charge element 402 can be comprised of step-up circuit 414. Battery 413 provides electrical energy input 573. Step-up circuit 414 changes the electrical energy input 573 from the battery 413 to input voltage 401. The required input voltage 401 of the present invention may be different than can be provided by existing batteries. For example typical batteries deliver electrical energy at 12 volts. The input voltage 401 required to achieve efficient energy recovery is in the rage of 2000 to 4000 volts for current electroactive polymers. At these voltages, with the dielectric constants for current electroactive polymers, the thickness of the polymer spacer 502 is in the range of 0.004 to 0.010 inches.

FIG. 15B shows a representative diagram for recovery element 403. Recovery element 403 of the present invention can be comprised of step-down circuit 417. Output voltage 406 from transducer 500 in unstretched position 615 is reduced to the level required for electric energy output 571 by recovery element 403. Electric energy output 571 from recovery element 403 flows to electrical storage device 419 or load resistance device 418. Storage device 419 can be a battery, storage capacitor or any other device that is appropriate for storing electrical energy. Load resistance device 418 can be any device that consumes electrical energy including but not limited to an electric motor, electrical lighting, or a radio.

The circuits, of energy conversion device 550, are not limited to those describe above. Variations on or more complex forms of charge element 402 and recovery elements 403 than those described above can be developed. The variation on or complexity of these circuits depends on the configuration of energy conversion device 550.

To understand the operation of energy conversion device 550, the operational parameters at two times $t_1$ and $t_2$ can be compared. At $t_1$, transducer 500 possesses capacitance $C_1$, and input voltage 401 $V_B$. The input voltage 401 $V_B$ can be provided by charge element 402. At a later time $t_2$, capacitance $C_2$ of transducer 500 is lower than capacitance $C_1$. Generally speaking, the higher capacitance $C_1$ occurs when the transducer 500 is in stretched configuration 625, and the lower capacitance $C_2$ occurs when transducer 500 is unstretched configuration 615. The capacitance of a capacitor can be estimated by well known formulas relating the capacitance to the area, thickness, and dielectric constant.

Typically, energy conversion device 550 operates at a particular operational voltage, $V_O$. The output voltage 406, $V_2$ that appears on the transducer at time, $t_2$ may be approximately related to charge $Q_1$ on the transducer 500 at $t_1$ as:

$$V_2 = Q_1/C_2 = C_1 V_B/C_2, \text{ where } Q_1 = Q_2$$

If it is assumed that $C_1$ is the maximum capacitance for the transducer 500, then $V_2$ is about the maximum voltage that could be produced by energy conversion device 550. When charge flows from transducer 500 after $t_2$, voltage is lower than when no charge has flowed. This is because the charge flow takes charge away from transducer 500. As a result, the charge on transducer 500 would be less than $Q_1$. Thus, the voltage on transducer 500 would be reduced.

Charge removed from energy conversion device 550 may be calculated by assuming a constant operational voltage $V_O$ which is between $V_B$ and the maximum voltage of energy conversion device 550. The recovery device 550 of this invention is not limited to a constant $V_O$ and the example is provided for illustrative purposes only. When the operational voltage of the recovery device 550 is assumed to be constant at the average of maximum and $V_B$ is:

$$V_O = \tfrac{1}{2}(V_2 + V_B) = \tfrac{1}{2}(C_1 V_B / C_2 + V_B), \text{ where } Q_1 = Q_2$$

The charge, $Q_O$ is on the transducer 500 is $C_2 V_O = \tfrac{1}{2} V_B (C_1 + C_2)$. In this example, the charge, $Q_{Out}$ that passes through recovery element 403 between $t_1$ and $t_2$ is the difference between the charge at $t_1$, $Q_1$ and the charge after $t_2$, $Q_O$. This means that $Q_{Out}$ may be computed as follows $$Q_{Out} = Q_1 - Q_O = V_B(C_1 - C_2)/2$$

When the transducer 500 operates at a substantially constant frequency, f, the current $I_L$ delivered to the device load resistance $R_L$ 418 by energy conversion device 550 is, $$I_L = f Q_{Out} = f V_B (C_1 - C_2)/2$$

and the power $P_L$, delivered to the load device load resistance $R_L$ 418 is, $$P_L V_O I_L = f V_O V_B (C_1 - C_2)/2$$

In the example above, the constant frequency, f is discussed for illustrative purposes only. Transducers of the present invention may operate at a constant frequency or a frequency that varies with time. Thus, the current, $I_L$ may also vary with time.

FIG. 16A shows energy conversion device 550, including multiple transducers 500, charge exchange means 350, charge element 402 and recovery element 403, affixed to wheel 20. Charge exchange means 350 is comprised of wheel side contact 320, axle side contact 330 and multiple electrical conduits 310.

FIG. 16B shows details of charge exchange means 350. Wheel side contact 320 is comprised of segmented cylinder 324, insulating cylinder 326, and base cylinder 322. The segmented cylinder 324 is comprised of a plurality of conducting elements 327 affixed to insulating cylinder 326. The conducting elements 327 are assembled in side-by-side pairs on the segmented cylinder 324. Each conducting element 327 is electrically insulated from each other by surrounding electrical insulation 328. Each conducting element 327 pair is electrically connected to a transducer 500. Two or more electrical conduits 310 provide the electrical connection between the pairs of conducting elements 327 and the transducer 500. One conducting element 327 is connected to top electrode 504 with one or more electrical conduits 310. And bottom electrode 506 of the transducers 500 is connected to the other conducting element 327 with one or more electrical conduits 310.

Axle side contact 330 is comprised of brush base 332, multiple two or more pairs of brush assemblies 334 and multiple electrical conduits 310. The brush assembly 334 pairs are positioned on brush base 332 so that each brush assembly 334 pair is in contact with a pair of conducting elements 327 of the segmented cylinder 324. Electrical conduits 310 provides the electrical connection between the two or more brush 334 pair and charge element 402 and recovery element 403

FIG. 16C shows charge exchange means 350 in charge circuit 354. At least two electrical conduits 310 provide electrical connection between charge element 402 and axle side contact 330 brush assembly 334 pair. The brush assembly 334 pair provides electrical contact between axle side contact 330 and wheel side contact 320. At least two electrical conduits 310 provide electrical connection between wheel side contact 320 conducting element 327 pair and transducer 500. Formation of charge circuit causes electrical energy input 573 to flow from charge element 402 through axle side contact 330 and through wheel side contact 320 to transducer 500

Wheel 20 continues to rotate causing the wheel side contact 320 conducting element 327 pair to lose contact with axle side contact 330 brush assembly 334 pair. The electrical energy input 573 remains on transducer 500 after conducting element 327 pair to brush assembly 334 pair contact is broken. Continued wheel 20 rotation causes charge exchange means 350 to form recovery circuit 358.

FIG. 16D shows charge exchange means 350 in recovery circuit 358. At least two electrical conduits 310 provide electrical connection between recovery element 403 and axle side contact 330 brush assembly 334 pair. Axle side contact 330 brush assembly 334 pair provides electrical connection between axle side contact 320 conducting element 327 pair. At least two electrical conduits 310 provide electrical contact between wheel side contact 320 conducting element 327 pair and transducer 500. Formation of recovery circuit 358 causes electrical energy output 571 to flow from transducer 500 through wheel side contact 320 and axle side contact 330 to recovery element 403.

Wheel 20 continues to rotate causing the wheel side contact 320 conducting element pair 327 to lose contact with axle side contact 330 brush assembly 334 pair. The transducer 500 returns to stretched position with little or no electrical charge. Wheel 20 continues to rotate so that charge means 350 charge circuit 354 is reformed.

Electrical conduits 310 are comprised of electrically conductive materials including conductive polymers, metals, and carbon fiber. These are limited examples of materials that can be used in conduits 310 and should not be construed as a complete listing of all materials that can be used of conduits 310.

The charge transfer means configurations described above are provided for illustrations purposes only. Many other charge transfer means configurations are possible and those described above are not meant to encompass all possible charge transfer means configurations.

CONCLUSIONS, RAMIFICATIONS, AND SCOPE OF INVENTION

Accordingly, the reader will see that the flexible member deflection mechanical energy recovery devices of this invention can be used generate electrical energy from deflection of flexible members of load transport wheels. Thus, this invention can be used as a means to recover a portion of the energy consumed in the operation of vehicles used to transport loads. The recovered energy can then be used to reduce the load transport operational costs and increase operational efficiency.

Furthermore, the flexible member deflection mechanical energy recovery device has additional advantages in that
- it provides deflection transfer devices to transfer flexible member deflections to an electroactive polymer transducer;
- it provides a charge element to add electric charge to an electroactive polymer transducer in stretched configuration;
- it provides a recovery element for recovering increased electrical charge from electroactive polymer transducers in relaxed configuration;

it provides a charge exchange means for exchanging electrical charge between a charge element and an electroactive polymer transducer;

it provides a charge exchange means for exchanging electrical charge between a recovery element and an electroactive polymer transducer;

it provides a charge exchange means that exchanges charge between a rotating wheel and a non-rotating vehicle.

Although the description above contains many specificities these should not be construed as limiting the scope of the invention but merely providing illustrations of some of the presently preferred embodiments of this invention. For example, single or multiple transducer assemblies can be affixed to an internal bladder that installed into the toroidal shaped cavity of the flexible member. It is also possible to contain single or multiple charge elements, recovery elements, and charge exchange means within the flexible member toroidal shaped cavity. The segmented cylinder of charge exchange means could be a segmented disk with each conducting element of the conducting element pairs affixed opposite faces of the segmented disk. Or the segmented cylinder could be a hollow segmented cylinder with the conducting element pairs positioned on the inside surface of the hollow cylinder.

Thus the scope of the invention should be determined by the append claims and their legal equivalents, rather than by the examples given.

I claim:

1. An energy conversion device for converting mechanical energy, from deflection of toroidal flexible member during rotation of the flexible member, to electrical energy, said energy conversion device comprising:
   a. one or more transducers, each transducer comprising at least two electrodes and a polymer spacer with the spacer sandwiched between said at least two electrodes in a configuration that causes a change in electric field in response to deflection of a portion of said polymer spacer; and
   b. one or more charge elements designed or configured to transfer electrical energy to said at least two electrodes when said portion of the spacer is deflected to a first position; and
   c. one or more recovery elements designed or configured to transfer electrical energy from said at least two electrodes when said portion of the spacer is deflected to a second position; and
   d. one or more deflection transfer elements that are designed or configured to receive deflection mechanical energy from said toroidal flexible member and transfers a portion of said deflection mechanical energy to said polymer spacer by deflecting the portion of said polymer spacer; and
   e. one or more charge exchange means designed or configured to form one or more electrical connections between said one or more charge elements and said two or more electrodes when said one or more said polymer spacers are deflected to said first positions and to form electrical connections between said one or more recovery elements and said two more electrodes when one or more said polymer space are deflected to said second positions.

2. The energy conversion device of claim 1 wherein said one or more transducers are disposed radially within said toroidal flexible member with one or more said deflection transfer elements that extend radially from said one or more transducer to said toroidal flexible member.

3. The energy conversion device of claim 2 wherein said one or more deflection transfer elements extend normally from one or more of the electrodes to toroidal flexible member.

4. The energy conversion device of claim 1 wherein said one or more transducers are disposed laterally within said toroidal flexible member and said one or more deflection transfer elements extend from said one or more transducers to said toroidal flexible member.

5. The energy conversion device of claim 1 wherein said two or more electrodes are disposed on opposite surfaces of a continuous belt of polymer spacer wherein said at two or more electrodes sandwich the polymer belt and comprise a transducer belt wherein said continuous belt of polymer spacer is disposed circumferentially within toroidal flexible member and said one or more deflection transfer elements extend normally from the electrodes.

6. A method for converting mechanical energy, generated from deflection of toroidal flexible member during rotation of the flexible member, to electrical energy, said energy conversion method provides:
   a. a transducer means providing one or more transducers wherein each transducer comprises at least two electrodes and a polymer spacer in a configuration that cause a change in electric field in response to deflection of a portion of said polymer spacer; and
   b. a charge element means that provides for transfer of electrical energy to said two or more electrodes when said portion of the polymer spacer is deflected to a first position; and
   c. a recovery element means that provides for transfer of electrical energy from said two or more electrodes when said portion of the polymer spacer is deflected to a second position; and
   d. a deflection transfer means providing one or more deflection transfer elements that receives deflection mechanical energy from said toroidal flexible member and transfers a portion of said deflection mechanical energy to said polymer spacer by deflecting the portion of said polymer spacer; and
   e. a charge exchange means that provides for formation of one or more electrical connections between said one or more charge elements and said two or more electrodes when said one or more said polymer spacers are deflected to said first positions and formation of electrical connections between said one or more recovery elements and said two more electrodes when one or more said polymer space are deflected to said second positions.

7. The method of claim 6 wherein said one or more transducers, of transducer means, are disposed radially within said toroidal flexible member and said one or more deflection transfer elements, of deflection transfer means, extend radially from the one or more transducers to said toroidal flexible member.

8. The method claim 7 wherein said one or more deflection transfer elements, of deflection transfer means, extend normally from one or more of the electrodes to said toroidal flexible member.

9. The method of claim 6 wherein one or more transducers of transducer means are disposed laterally and said one or more deflection transfer elements, of deflection transfer means, extends laterally from said one or more transducers to said toroidal flexible member.

10. The method of claim 6 wherein said two or more electrodes are disposed on opposite surfaces of a continuous belt of polymer spacer wherein said at least two or more electrodes sandwich the polymer belt and comprise a transducer belt wherein said continuous belt of polymer space is disposed circumferentially within toroidal flexible member and said one or more deflection transfer elements extend normally from the electrodes.

11. An energy conversion device for converting mechanical energy to electrical energy from deflection of a vehicle or stationary structure mounted toroidal flexible member during rotation of the flexible member, said energy conversion device comprising:
   a. one or more transducers, each transducer comprising at least two electrodes and a polymer spacer with the spacer sandwiched between said at least two electrodes in a configuration that cause a change in electric field in response to deflection of a portion of said polymer spacer; and
   b. one or more charge elements designed or configured to transfer electrical energy to said at least two electrodes when said portion of the spacer is deflected to a first position; and
   c. one or more recovery elements designed or configured to transfer electrical energy from said at least two electrodes when said portion of the spacer is deflected to a second position; and
   d. one or more deflection transfer elements that are designed or configured to receive deflection mechanical energy from said toroidal flexible member and transfer a portion of said deflection mechanical energy to said polymer spacer by deflecting the portion of said polymer spacer; and
   e. one or more charge exchange means designed or configured to form one or more electrical connections between said one or more charge elements and said two or more electrodes when said one or more said polymer spacers are deflected to said first positions and to form electrical connections between said one or more recovery elements and said two more electrodes when one or more said polymer spacers are deflected to said second positions.

12. The vehicle of claim 11 is self propelled wherein the mechanical energy to electrical energy conversion occurs when said vehicle is conveyed by rotation of one or more toroidal flexible members.

13. The vehicle of claim 11 is pulled or pushed wherein the mechanical energy to electrical energy conversion occurs when said vehicle is-conveyed by rotation of one or more toroidal flexible members.

14. The stationary structure of claim 11 supports one or more rotating flexible members that support a load bearing belt wherein the mechanical energy to electrical energy conversion occurs during rotation of said one or more toroidal flexible members.

15. The stationary structure of claim 11 supports one or more rotating flexible members that support a load bearing cable wherein the mechanical energy to electrical energy conversion occurs during rotation of said on or more toroidal flexible members.

16. A method for converting mechanical energy, generated from deflection of vehicle or stationary structure mounted toroidal flexible member during rotation of said flexible member, to electrical energy, said energy conversion method provides:
   a. a transducer means providing one or more transducers that causes a change in electric field wherein each transducer comprises at least two electrodes and a polymer spacer in a configuration that cause a change in electric field in response to deflection of a portion of said polymer spacer; and
   b. a charge element means that provides for transfer electrical energy to said two or more electrodes when said portion of the polymer spacer is deflected to a first position; and
   c. a recovery element means that provides for transfer electrical energy from said two or more electrodes when said portion of the polymer spacer is deflected to a second position; and
   d. a deflection transfer means providing one or more deflection transfer elements that receives deflection mechanical energy from said toroidal flexible member and transfers a portion of said deflection mechanical energy to said polymer spacer by deflecting the portion of said polymer spacer; and
   e. a charge exchange means that provides for formation of one or more electrical connections between said one or more charge elements and said two or more electrodes when one or more said polymer spacers are deflected to said first positions and formation of electrical connections between said one or more recovery elements and said two more electrodes when one or more said polymer spacers are deflected to said second positions.

17. The mechanical energy to electrical energy conversion method of claim 16 wherein said vehicle is self propelled.

18. The mechanical to electrical energy conversion method of claim 16 wherein said vehicle is pulled or pushed.

19. The method of claim 16 wherein stationary structure supports one or more rotating flexible members that support a load bearing belt wherein the mechanical energy to electrical energy conversion occurs during rotation of said one or more toroidal flexible members.

20. The method of claim 16 wherein stationary structure supports one or more rotating flexible members that support a load bearing cable wherein the mechanical energy to electrical energy conversion occurs during rotation of said one or more toroidal flexible members.

* * * * *